(12) United States Patent
Hoffman et al.

(10) Patent No.: US 8,327,756 B1
(45) Date of Patent: Dec. 11, 2012

(54) OVEN WITH DOOR LOCKING SYSTEM FOR COOKING FOOD UNDER PRESSURE

(75) Inventors: Steve Hoffman, Mahwah, NJ (US); Jesus Cordero, Totowa, NJ (US)

(73) Assignee: Kitchen Concepts LLC, New York, NY (US)

( * ) Notice: Subject to any disclaimer, the term of this patent is extended or adjusted under 35 U.S.C. 154(b) by 0 days.

(21) Appl. No.: 13/545,789

(22) Filed: Jul. 10, 2012

(51) Int. Cl.
*A47J 31/00* (2006.01)

(52) U.S. Cl. ............ 99/337; 99/467; 126/197; 126/190; 219/400; 219/401; 292/113; 292/266; 292/223; 292/DIG. 69; 292/273; 70/81; 70/91; 70/101

(58) Field of Classification Search .................... 99/337, 99/467, 473, 476; 219/400, 401, 440; 126/190, 126/192, 194, 197; 292/110, 113, 266, 271, 292/273, 327, 223, 296, 341, DIG. 69; 70/81, 70/91, 101
See application file for complete search history.

(56) References Cited

U.S. PATENT DOCUMENTS

| | | | |
|---|---|---|---|
| 884,288 A | 4/1906 | Nash | |
| 2,634,749 A | 4/1953 | Cone | |
| 3,428,783 A | 2/1969 | Niles | |
| 3,596,651 A | 8/1971 | Welshofer et al. | |
| 4,039,776 A | 8/1977 | Roderick | |
| 4,103,671 A * | 8/1978 | Smith | 126/200 |
| 4,133,337 A * | 1/1979 | Shea | 126/197 |
| 4,246,955 A | 1/1981 | Skala | |
| 4,410,030 A | 10/1983 | Skala | |
| 4,430,557 A | 2/1984 | Eichelberger et al. | |
| 4,455,924 A | 6/1984 | Wenzel | |
| 4,512,331 A | 4/1985 | Levi | |
| 4,593,945 A | 6/1986 | Arute et al. | |
| 4,798,939 A | 1/1989 | Nett | |
| 4,813,398 A | 3/1989 | Savage | |
| 4,947,036 A | 8/1990 | Pokorski et al. | |
| 4,995,313 A | 2/1991 | Delau et al. | |
| 5,168,797 A | 12/1992 | Wang | |
| 5,205,273 A | 4/1993 | Sparks et al. | |
| 5,417,148 A | 5/1995 | Cavallo | |
| 5,767,487 A | 6/1998 | Tippmann | |
| 5,887,916 A | 3/1999 | Finkelstein et al. | |
| 5,978,863 A | 11/1999 | Gates et al. | |
| 5,988,842 A | 11/1999 | Johnsen et al. | |
| 6,095,851 A | 8/2000 | Laity et al. | |
| 6,310,325 B1 | 10/2001 | Colburn | |
| 6,316,749 B1 | 11/2001 | Bales et al. | |
| 6,445,287 B1 | 9/2002 | Schofield et al. | |
| 6,537,065 B1 | 3/2003 | Shirali et al. | |

(Continued)

OTHER PUBLICATIONS http://travel.yahoo.com/p-travelguide-331872701R-ruths__chris__ steak_house_pasadena-i, Ruth's Chris Steak House—Pasadena, CA—Yahoo Travel Reviews, Feb. 27, 2007, 1 page.

*Primary Examiner* — Reginald L Alexander
(74) *Attorney, Agent, or Firm* — Drinker Biddle & Reath LLP

(57) ABSTRACT

An oven system is disclosed that includes an oven housing. A door is hingedly attached to the housing through a locking assembly designed to lock and seal an opening in the housing. The locking assembly includes floating latch and hinge systems which can be translated into and away from the opening of the housing.

28 Claims, 14 Drawing Sheets

U.S. PATENT DOCUMENTS

| | | |
|---|---|---|
| 6,679,246 B2 | 1/2004 | Strolz et al. |
| 6,727,814 B2 | 4/2004 | Saltzstein et al. |
| 6,736,631 B2 | 5/2004 | Ferlin et al. |
| 6,747,874 B2 | 6/2004 | McKinnon et al. |
| 6,756,911 B2 | 6/2004 | Striano et al. |
| D499,604 S | 12/2004 | Hooper et al. |
| 6,867,704 B2 | 3/2005 | Pellegrino |
| 7,000,530 B2 | 2/2006 | Damrath et al. |
| 7,002,453 B2 | 2/2006 | Martinez |
| 7,049,976 B2 | 5/2006 | Hunt et al. |
| 7,194,183 B2 | 3/2007 | Thornton et al. |
| 2004/0008920 A1 | 1/2004 | Endicot |
| 2005/0034716 A9 | 2/2005 | Harbin |
| 2006/0113294 A1 | 6/2006 | LoMaglio et al. |
| 2006/0254893 A1 | 11/2006 | Mills et al. |
| 2006/0289441 A1 | 12/2006 | Bartelick |
| 2007/0059975 A1 | 3/2007 | Walsh |
| 2007/0068918 A1 | 3/2007 | Adamczak et al. |
| 2007/0074591 A1 | 4/2007 | Santos et al. |
| 2007/0240701 A9 | 10/2007 | Schnell et al. |
| 2010/0310733 A1 | 12/2010 | Hoffman |

\* cited by examiner

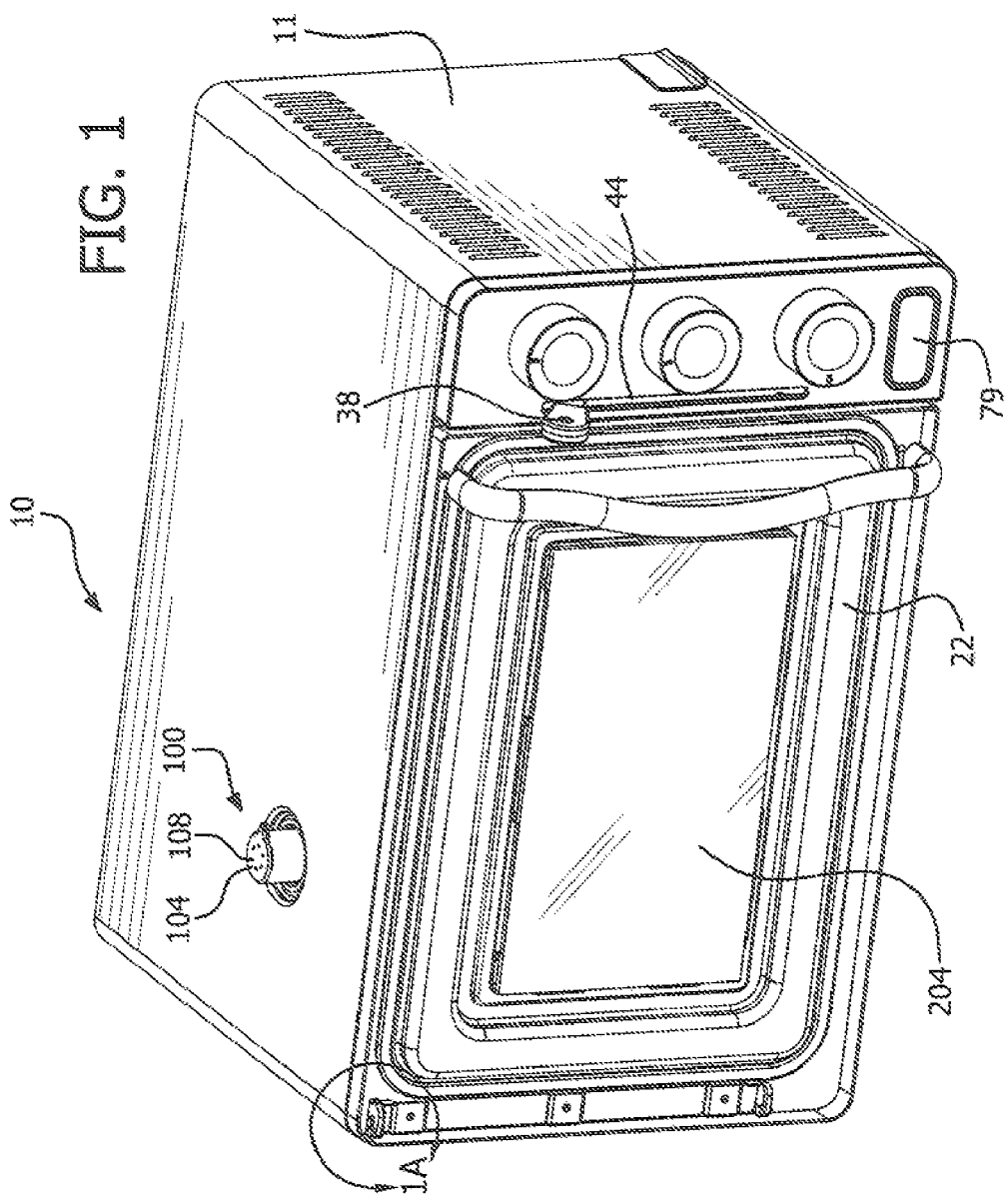
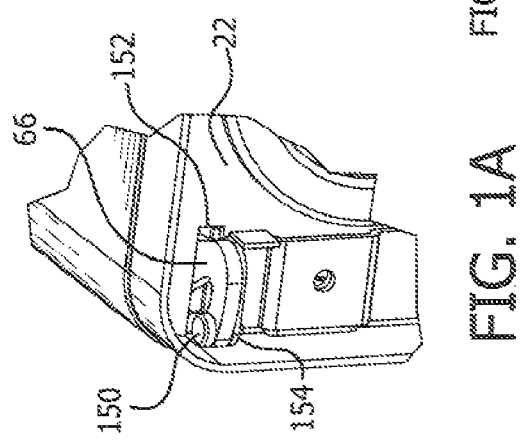

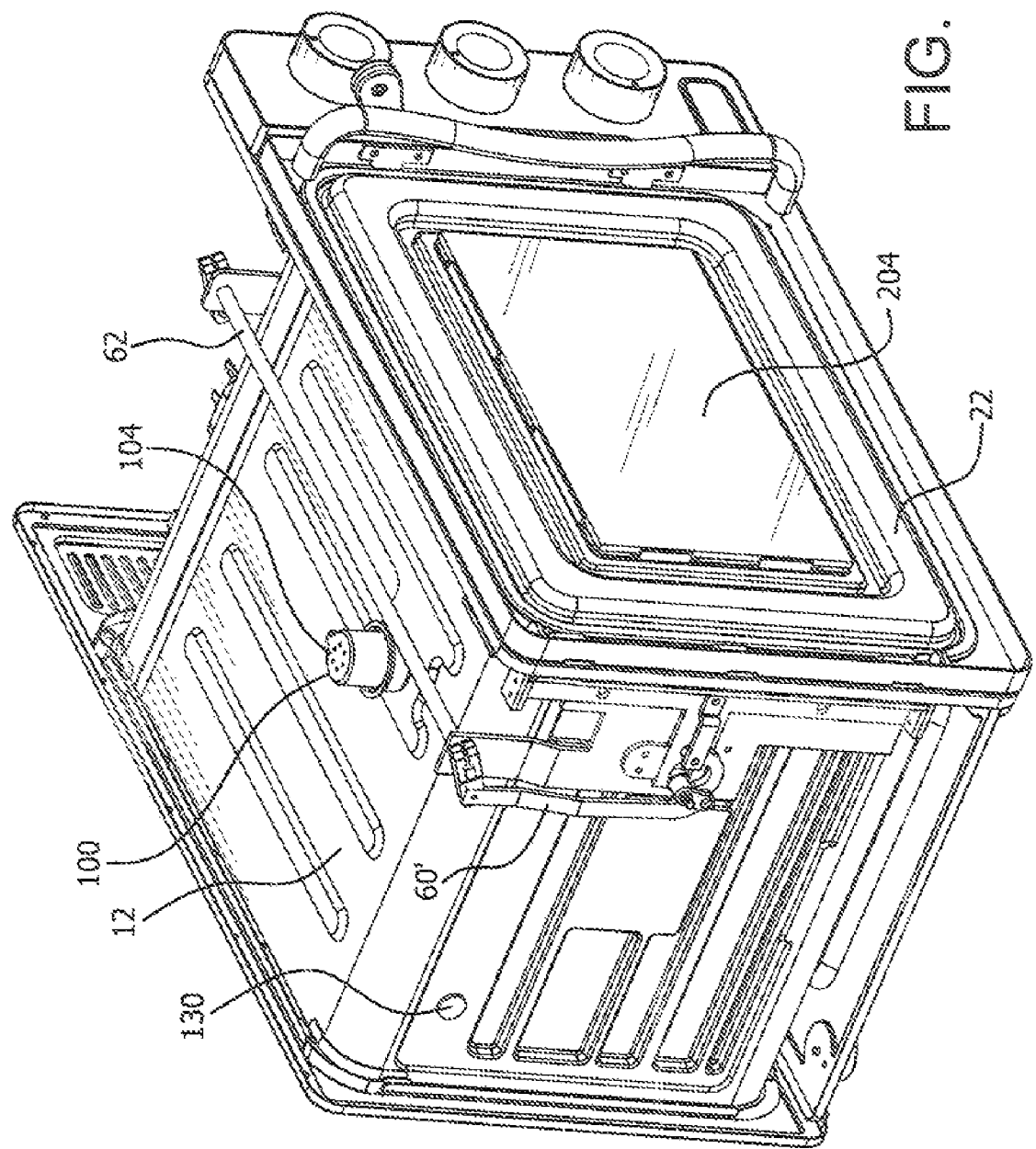

OVEN WITH DOOR LOCKING SYSTEM FOR COOKING FOOD UNDER PRESSURE

FIELD OF THE INVENTION

The present invention relates to an oven for cooking food while under pressure and, more particularly, to an oven with a locking door designed to retain pressure within the oven and provide an easy opening release.

BACKGROUND

US Published Patent Application 2010/0310733 describes one version of pressurized oven for generating an above ambient pressure environment within the cavity of an oven for providing high speed cooking of foodstuffs. The oven in that application included a unique door that was designed to maintain the pressure while permitting opening and closing of the oven.

The embodiment disclosed in that application was particularly suitable for an automated system. However a need still exists for an oven with a simpler door system designed to permit ease of entry into the cavity, while maintaining a high pressure environment.

SUMMARY OF THE INVENTION

The present invention relates to an oven system that includes an oven enclosure having front, back, top, bottom and side walls. A door is hingedly attached to one of the walls for sealing an opening in the front wall. A heating system is connected to the enclosure for generating heat in the enclosure. The heating system may be a gas or electric heating system configured to heat the interior of the oven enclosure. The oven includes a locking system mounted to the housing and engaged to the door for sealing the door during operation and withstand increased loads due to pressure within the oven.

In one embodiment of the invention, the locking assembly includes an actuation lever pivotally mounted to the housing. The lever includes a lever arm that extends forwardly past the front wall of the housing adjacent to the door. The lever includes a mounting plate connected to the arm and pivotally mounted to the housing.

A first lock subassembly is located adjacent to one of the sidewalls and includes a first actuator plate that is slideably disposed adjacent to the side wall and connected to the lever mounting plate such that rotation of the lever causes the first actuator plate to transition laterally along the sidewall in a sealing direction toward either the front or rear walls. The first actuator plate has a door lock component mounted on the actuator plate which is adapted to engage and lock with a complementary door lock component mounted on the door for locking the door to the first actuator plate when the door is closed against the front wall of the oven. The first actuator plate is adapted to transition the door lock components when they are engaged in the sealing direction when the lever is pivoted between a first open position and a second sealed position. The transition in the sealing direction acts to pull the locked door into the front wall of the oven.

A second lock subassembly is located adjacent to another side wall of the oven on the opposite side from the first lock subassembly. The second lock subassembly includes a second actuator plate slideably disposed adjacent to the side wall. A connector assembly connects the second actuator plate to the first actuator plate such that pivoting of the lever causes the second actuator plate to transition laterally along the side wall in the sealing direction. The second actuator plate has a hinge component mounted to it that is configured to engage with another hinge component on the door for hingedly attaching the door to the second actuator plate. The second actuator plate is adapted to transition the first and second hinge components in the sealing direction when the lever is pivoted between its first open position and its second sealed position. The transition in the sealing direction functions to pull the hinged door into the front wall of the oven.

The connector assembly may include a first connector arm attached to the lever plate, a second connector arm attached to the second actuator plate, and a crossbar attached to the first and second connector arms.

In one embodiment, the first lock subassembly includes a first linkage connecting the first actuator plate to the lever plate. The first linkage is adapted to cause the rotary motion of the lever to produce lateral motion of the first actuator plate.

The lock component mounted on the first actuator plate is preferably pivotally mounted on the first actuator plate, and biased against pivoting, such as with a spring.

The second lock subassembly preferably includes a second linkage connecting the second actuator plate to the connector assembly and adapted to cause the rotary motion of the lever to produce lateral motion of the second actuator plate.

In one embodiment the crossbar of the connector assembly is attached to the first connector arm though a bracket such that upward movement of the first connector are causes rotation of the crossbar, and the crossbar is attached to the second connector arm through a bracket such that rotation of the crossbar causes the second connector are to move upward.

In one embodiment, the oven includes a pressure release system with a release valve mounted to the housing, and a conduit connected to the housing and communicating with the cavity. The release valve controls flow of gas out of the conduit. An accumulator may be connected to the release valve and adapted to capture moisture in the gas prior release to the atmosphere. The release valve may include an actuation switch with a first state where the valve is in its open position, and a second state where the valve is in its closed position. The switch may be actuated between its first and second states by the lever.

The release system may include a first limit valve mounted to the housing and including a conduit communicating with the cavity. The limit valve is configured to permit pressurized air to flow out of the conduit when the pressure within the conduit exceeds a prescribed threshold value. In one embodiment, the first limit valve includes a weighted cap with a surface that blocks the conduit when the pressure within the conduit is below the prescribed threshold value. The cap is adapted to transition relative to the conduit so as to open the conduit when the pressure in the conduit is above the prescribed threshold value.

The foregoing and other features and advantages of the present invention will become more apparent in light of the following detailed description of the preferred embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

The above and other aspects, features and advantages of the present invention will be more apparent from the following more particular description thereof, presented in conjunction with the following drawings wherein:

FIG. 1 is an isometric view of an oven according to an embodiment of the present invention. The oven is shown with its front face plate of the door removed.

FIG. 1A is a partial enlarged view of a hinge for attaching the door to the oven housing.

FIG. 12 is a front isometric view of the oven of FIG. 2 illustrating the front door with its front face plate removed.

DETAILED DESCRIPTION OF THE PREFERRED EMBODIMENTS

Figure 11:
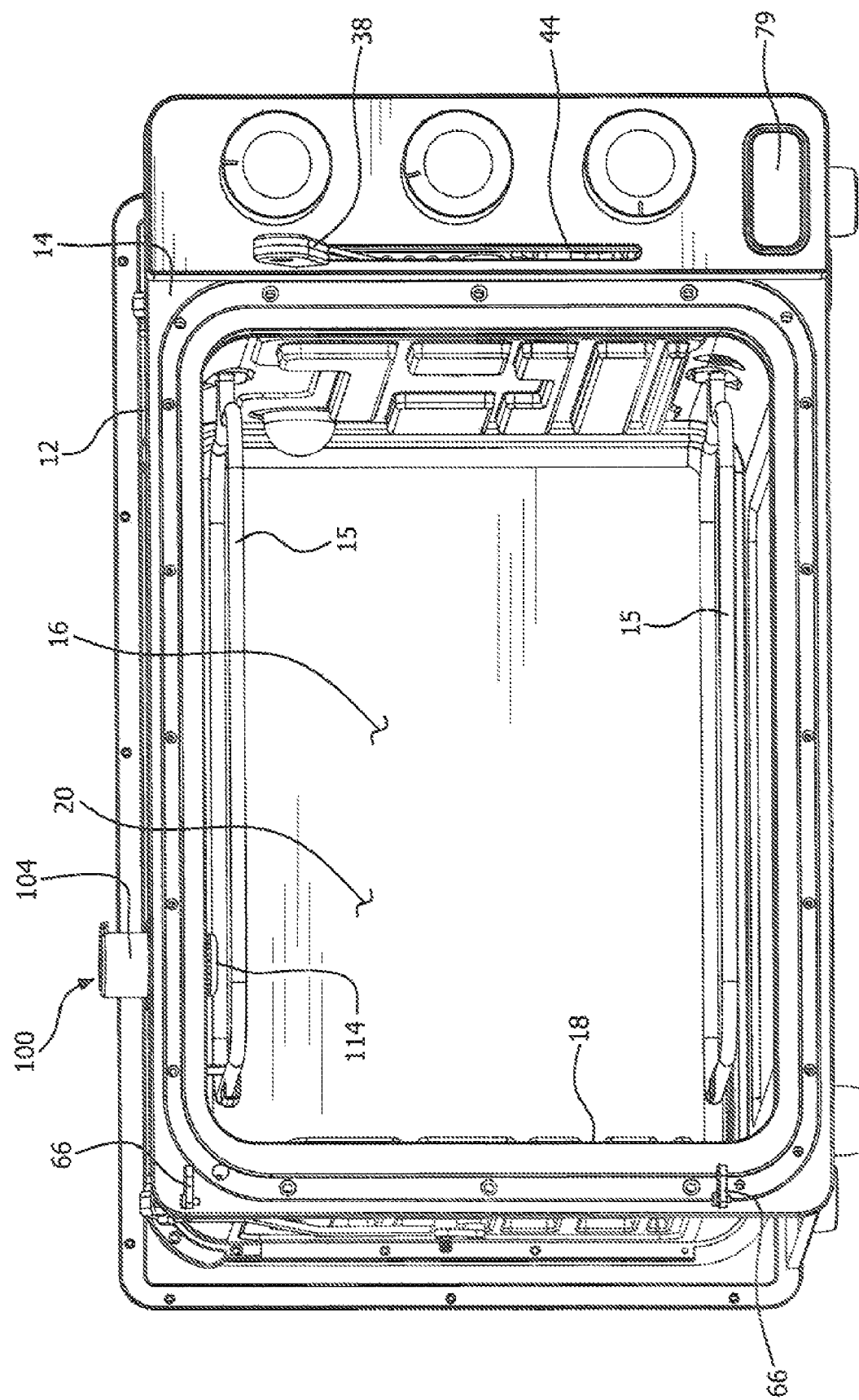
FIG. 11 is a view of the oven of FIG. 2 with the outer shell and front door removed.
Figure 13A:
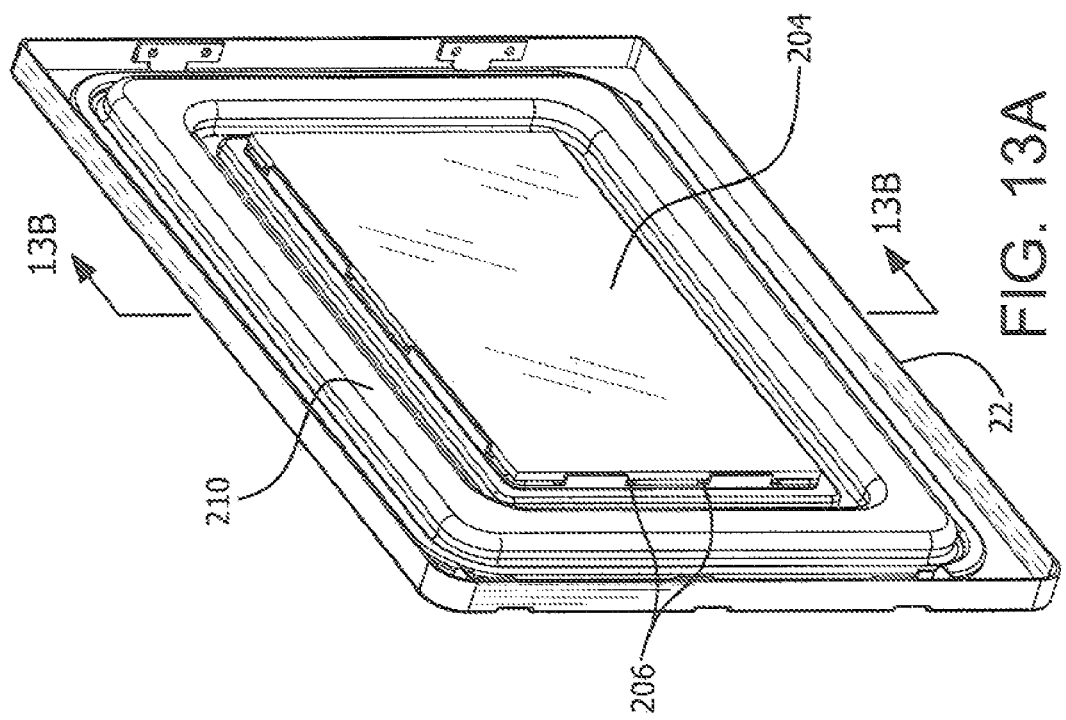
FIG. 13A is an isometric view of the oven door of FIG. 12.
Figure 13B:
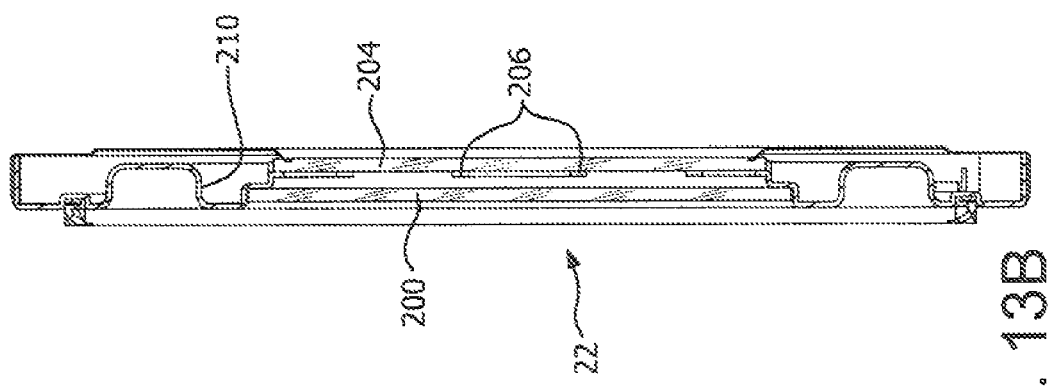
FIG. 13B is a cross-sectional view of the door of FIG. 13A.

Referring now to the drawings wherein like reference numerals refer to similar elements throughout the views, a version of a tabletop oven 10 is shown in FIG. 1. The oven includes an outer enclosure 11 and a multi-walled outer housing 12 (FIG. 2) with at least a partially open front wall 14, a rear wall and multiple side walls. A heating chamber 16 (FIG. 11) is located within and defined by the housing 12 and has an opening 18 that is accessible through the open front of the housing 12. The heating chamber 16 includes heating elements 15, such as those disclosed in U.S. patent application Ser. No. 12/734,737, the disclosure of which is incorporated herein by reference in its entirety, located within a cavity 20 defined by the chamber. The housing 12 is preferably made from stainless steel material. The oven enclosure or housing 12 is preferably made from conventional materials, such as steel, and configured to withstand pressures in excess of ambient. More preferably, the oven housing walls 12 are designed to withstand pressures greater than 5 psi. The present invention contemplates that the oven will be subjected to internal pressures ranging between about 0 psi and about 2 psi during most cooking cycles, but the present invention is not limited to those pressures and, depending on the food it is designed to be used to cook, can be constructed so as to withstand pressures higher that 20 psi during use. The walls of the oven housing 12, thus, may be designed to withstand the likely highest pressures that the particular oven is intended to be used for. Suitable walls may be constructed, for example, through the use of steel plates reinforced with a frame structure.

A door 22 is mounted to the housing 12 and, as will be discussed in more detail below, the door closes the open front 14 and substantially seals the opening 18. The door 22 is hinged on one side to the housing 12 so as a swing between open and closed positions. The door 22 is mounted to the housing through an oven locking or sealing assembly 24. The door 22 preferably includes a window 204 for viewing the contents within the cavity 20, and a seal around a portion of the internal facing surface which is designed to engage the housing 12 of the heating chamber 16 around the opening 18 for providing a substantial thermal and pressure seal between the door 22 and the heating chamber 16. Of course it should be readily apparent that the seal can be located, instead or in addition, on the housing.

The locking assembly 24 in the present invention includes a portion that floats relative to the housing 12. That is, the locking assembly 24 is designed to hinge and lock the door to the housing 12, and to transition the door laterally toward and away from the front of the housing as will be discussed in more detail below. In one embodiment, the locking assembly 24 includes right and left lock subassemblies 26, 28. Each subassembly includes a mounting plate 30, 30' adapted to be secured to the front wall for attaching the locking assembly 24 to the housing 12. As will be discussed in more detail below and shown in FIGS. 1A and 5, the left lock subassembly 28 includes a hinge component that engages with a mating hinge component mounted on the door 22. The hinge component on the left lock subassembly is connected to the housing 12 so as to be slidable relative housing 12. The right lock subassembly 26 includes a door latch component that engages with a complementary door latch component connected to the door 22. The door latch component on the right lock subassembly 24 is connected to the housing so as to be slidable relative to the housing.

Figure 3:
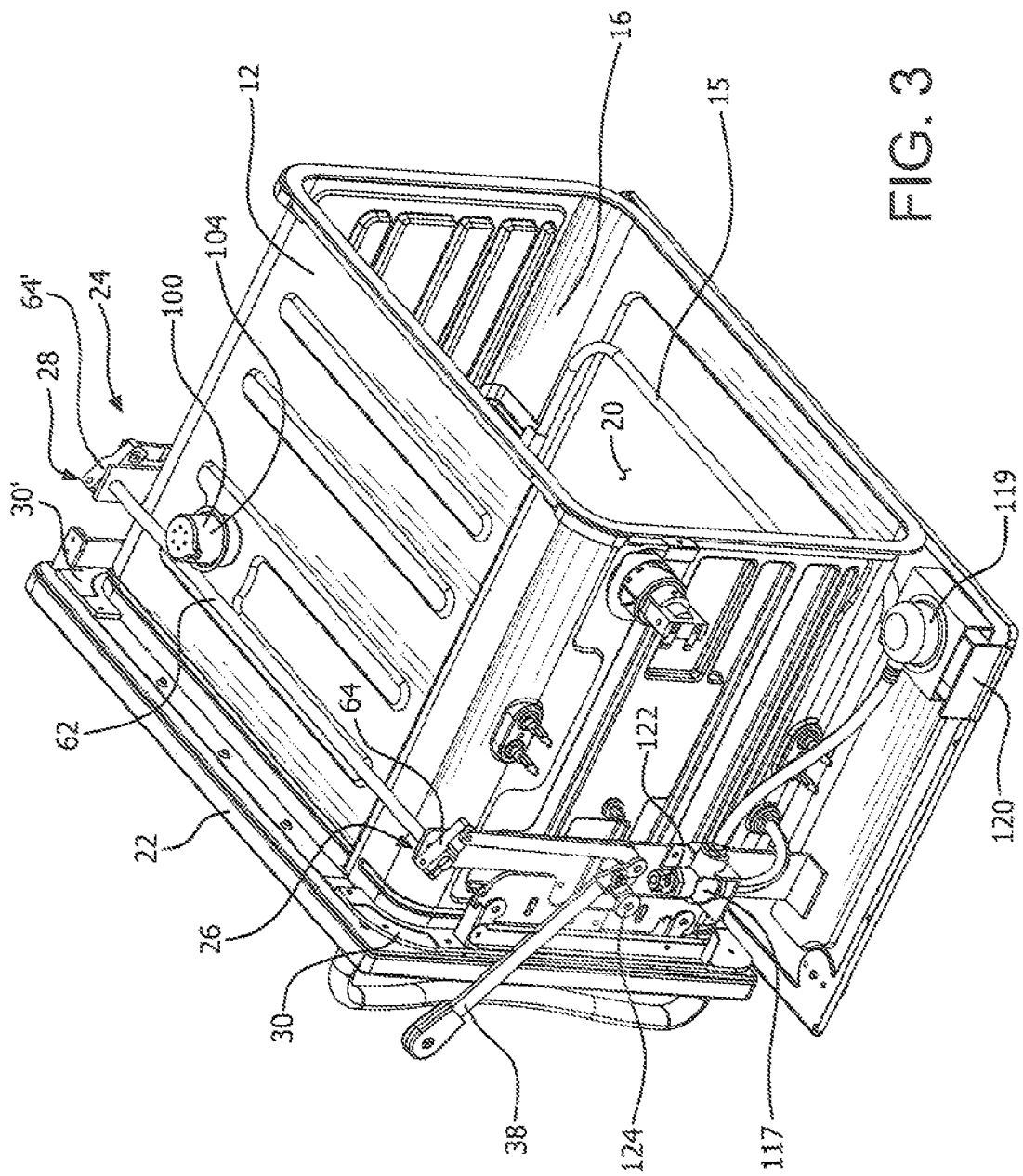
FIG. 3 is an isometric view of the oven of FIG. 2 taken from the rear with the rear wall removed.
Figure 4:
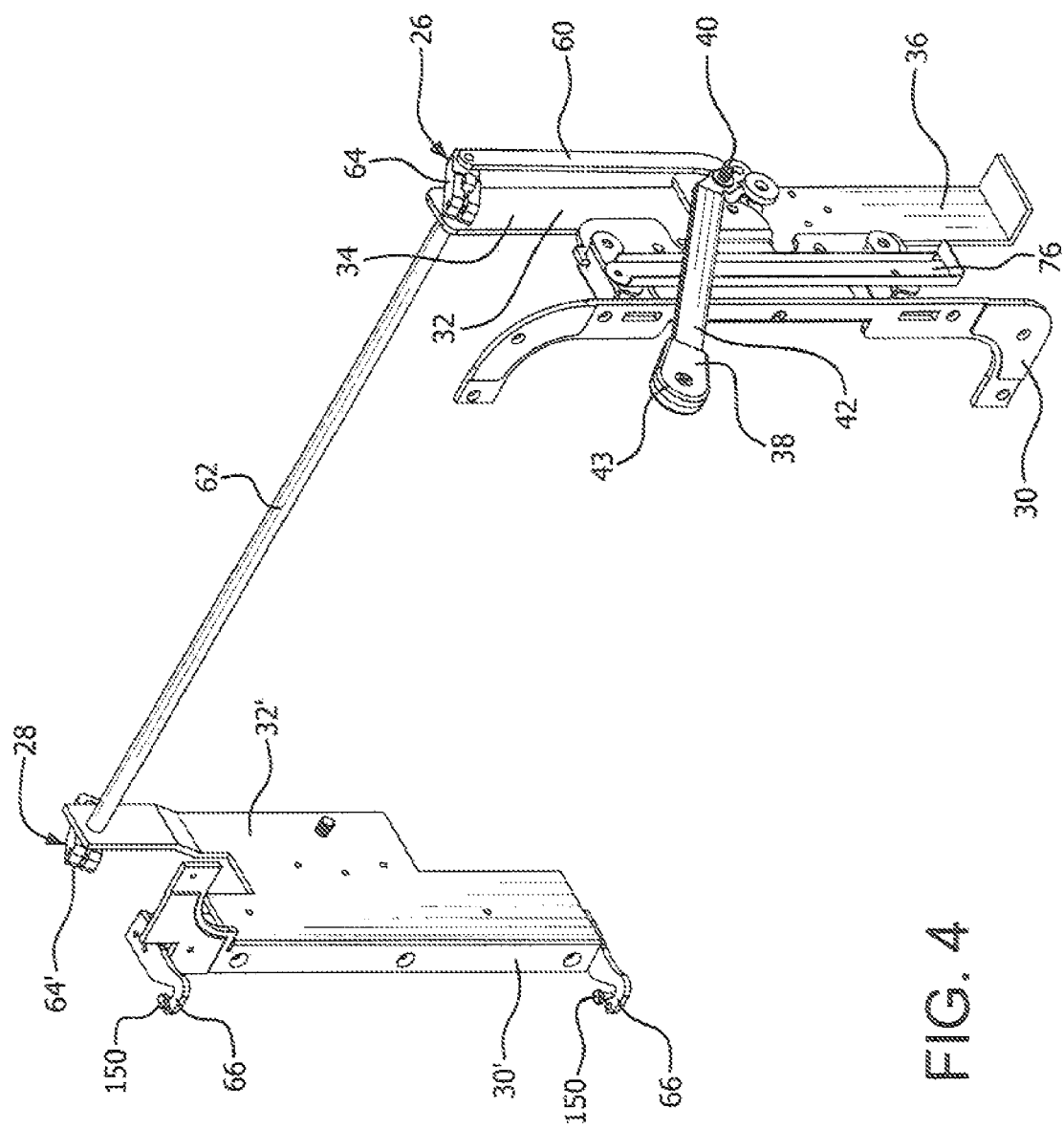
FIGS. 4 and 5 are isometric views of a locking assembly according to an embodiment of the present invention for use in the oven of FIG. 1.
Figure 5:
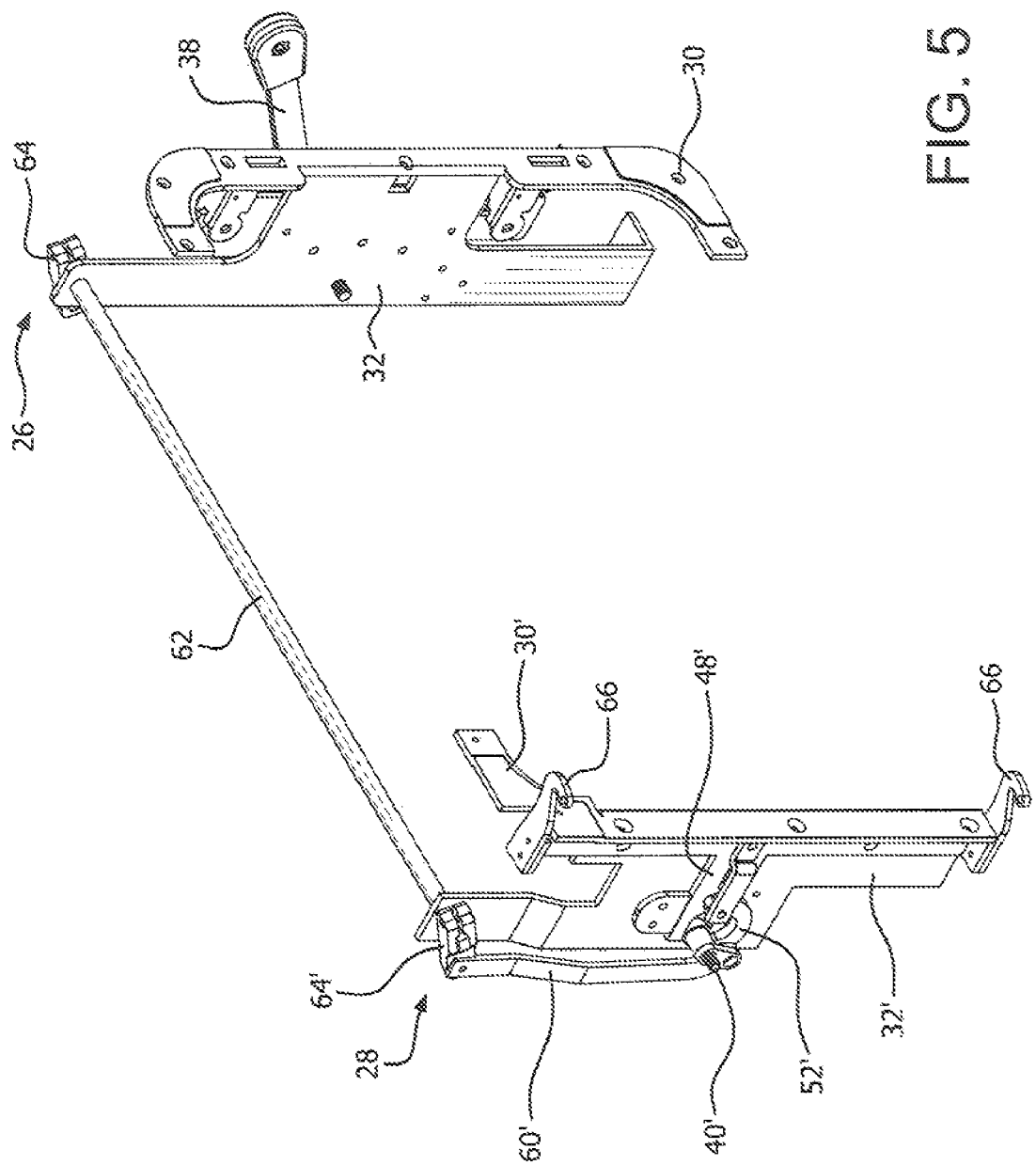

As shown in FIGS. 3-5, the right lock subassembly 26 preferably includes a support panel 32 which is attached to the mounting plate 30 and, thus, secured to the housing 12. The panel 32 is preferably substantially perpendicular to the mounting plate 30 and rear inwardly facing surface of the door 22. The panel 32 preferably includes a substantially upwardly projecting arm 34 and downwardly projecting leg 36.

Figure 6:
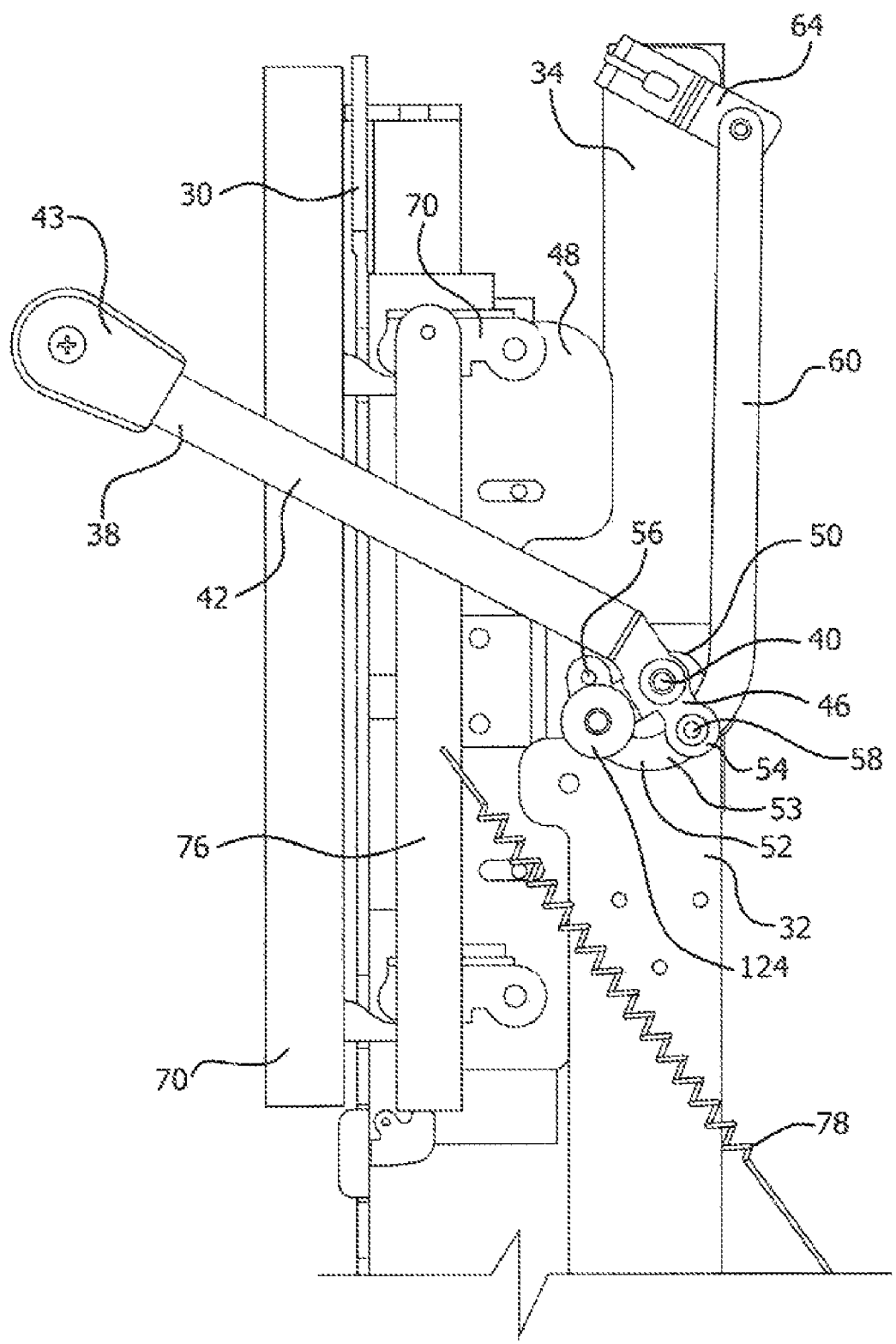
FIGS. 6-8 are schematic side views of a subassembly of the locking assembly mounted to the oven in its unlocked, locked and sealed positions, respectfully.
Figure 7:
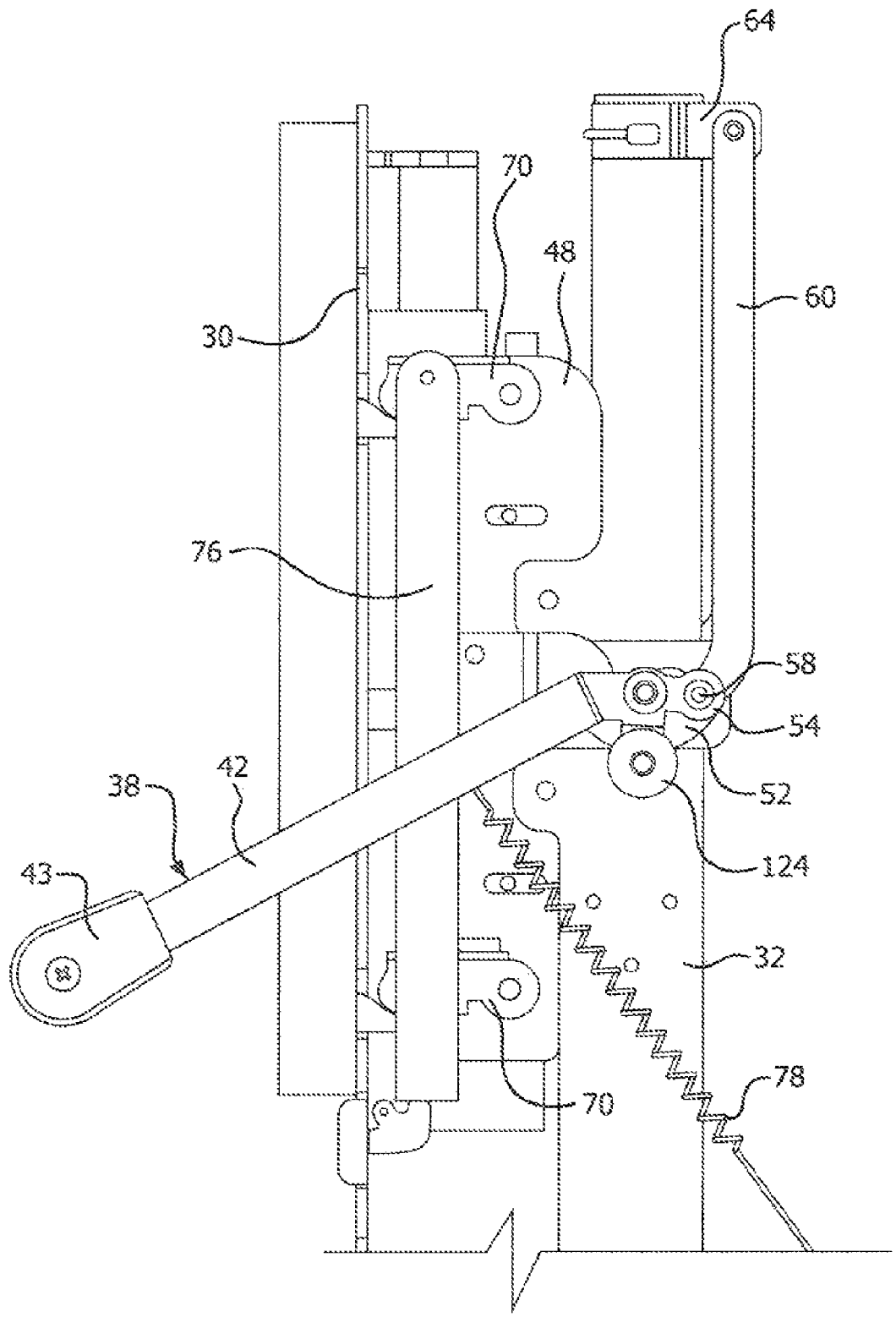
Figure 8:
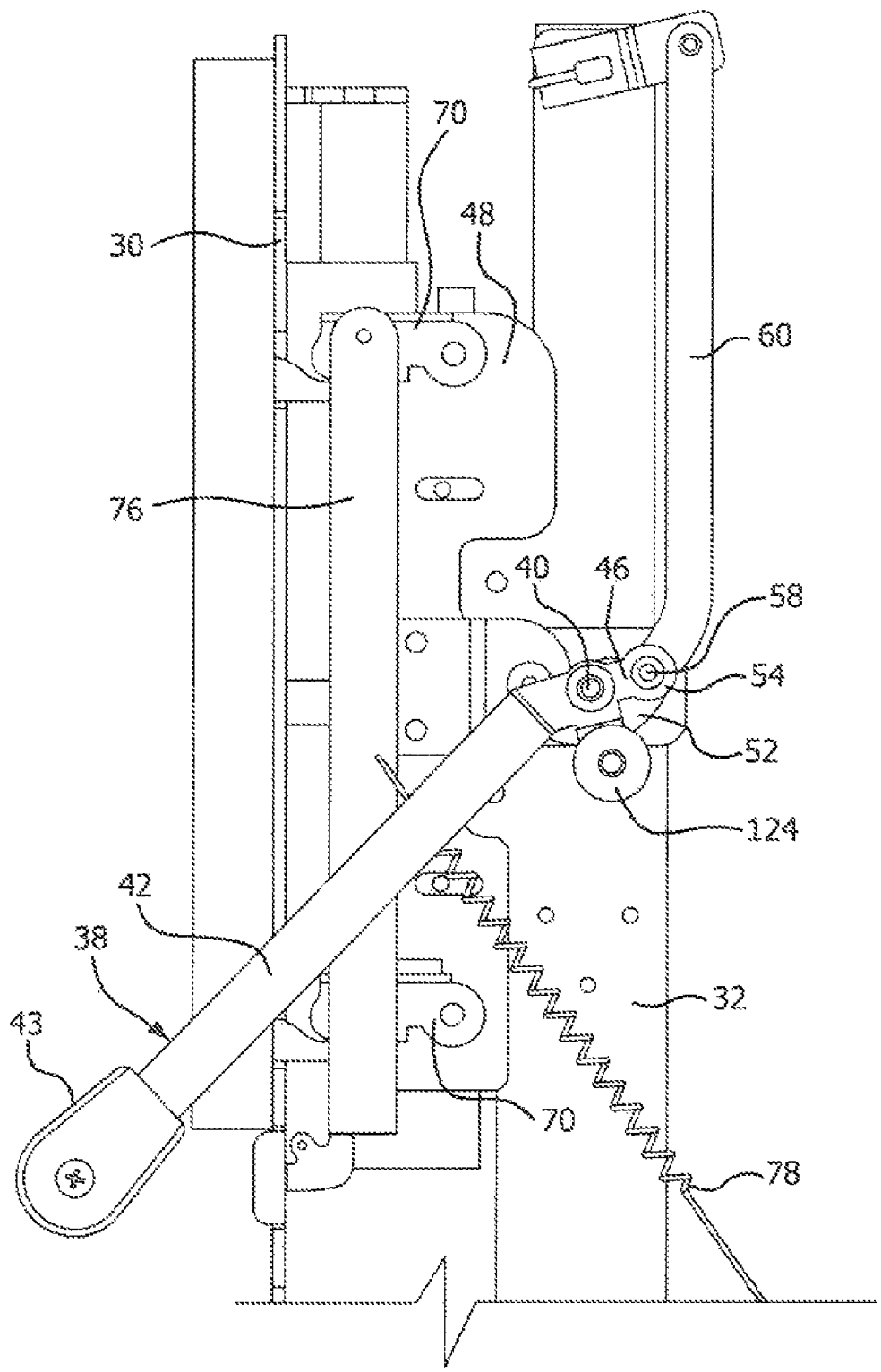

Referring to FIGS. 6-8, a locking lever 38 is pivotally mounted to the panel 32 about pin 40. The lever 38 includes an arm 42 that extends forwardly and through a slot 44 in the front of the housing 12 (shown in FIG. 1). The arm 42 terminates at a handle 43. The slot 44 preferably extends substantially vertically in the housing 12. The lever 38 is configured to move vertically through the slot 44 as it pivots about the pin 40. The lever 38 also includes a lever plate 46 where the lever mounts to the pin 40.

An actuator plate 48 is positioned between the lever 38 and the panel 32. The actuator plate 48 includes a slot 50 mounted around the pin 40 and configured to permit the plate 48 to slide on or relative to the panel 32 along the side wall of the housing in a sealing direction substantially perpendicular to the front wall (i.e., horizontally toward and away from the front of the housing 12.) A linkage 52 is located between the lever plate 46 and the actuator plate 48. In one embodiment, the linkage 52 is preferably substantially C-shaped with the open inner curved portion 53 of the linkage positioned about the pin 40 such that attachment lugs 54, 56 of the linkage are located on opposite sides of the pin 40. As will become more apparent below, the linkage rotates about the pin 40. The lever 38 includes a mounting hole 58 on the lever plate 46 which is pivotally attached to the attachment point 54 on the linkage 52, on the opposite side of the pin 40 from the arm 42. Thus, the vertical movement of the lever 38 causes it to pivot about pin 40 and, in turn, causes the linkage 52 to rotate in an arc about the pin 40.

The opposite attachment lug 56 of the linkage is pivotally attached to the actuator plate 48 on the opposite side of the pin 40 from the attachment to the lever. Due to the configuration of the linkage 52 and the attachment locations, as the lever 38 transitions vertically downward from its unsealed position (FIG. 6) to its sealed position (FIG. 7), the linkage 52 rotates about the pin 40. Since the linkage 52 is mounted to the actuator plate 48 on its opposite end, the linkage 52 causes the actuator plate 48 to transition substantially laterally (horizontally) along the side of the oven toward the pin 40 (toward the rear of the oven). Hence, the motion of the actuator plate 48 as the lever moves downward is inward toward the pin 40 (i.e., toward the back of the housing 12.) The lateral movement does not need to be much, preferably about ¼ to about ½ inch. As will be discussed below, the lateral motion is designed to pull the door in toward the housing, thus providing a good pressure seal.

Figure 10A:
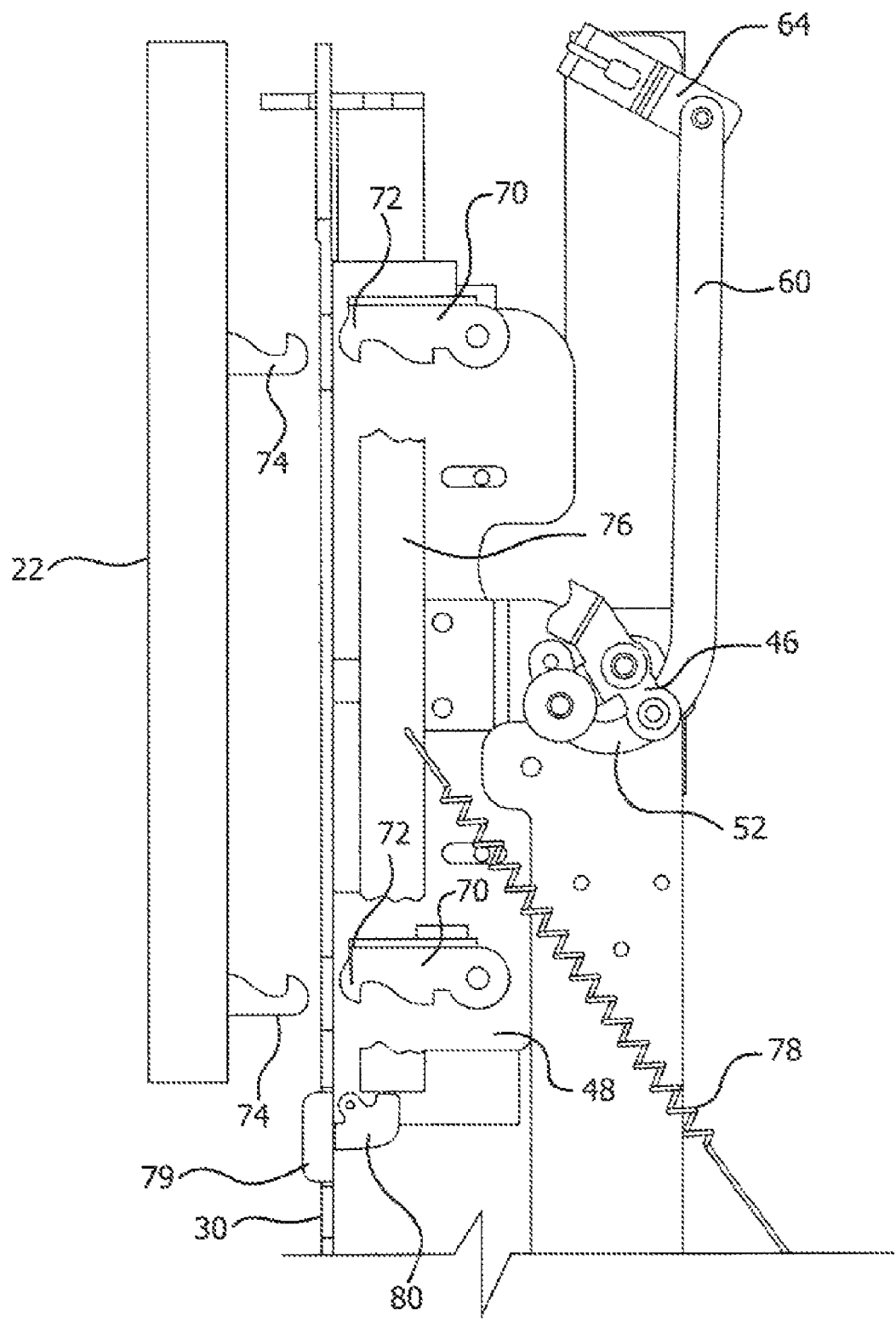
FIGS. 10A and 10B illustrate a door lock assembly according to one embodiment of the invention.
Figure 10B:
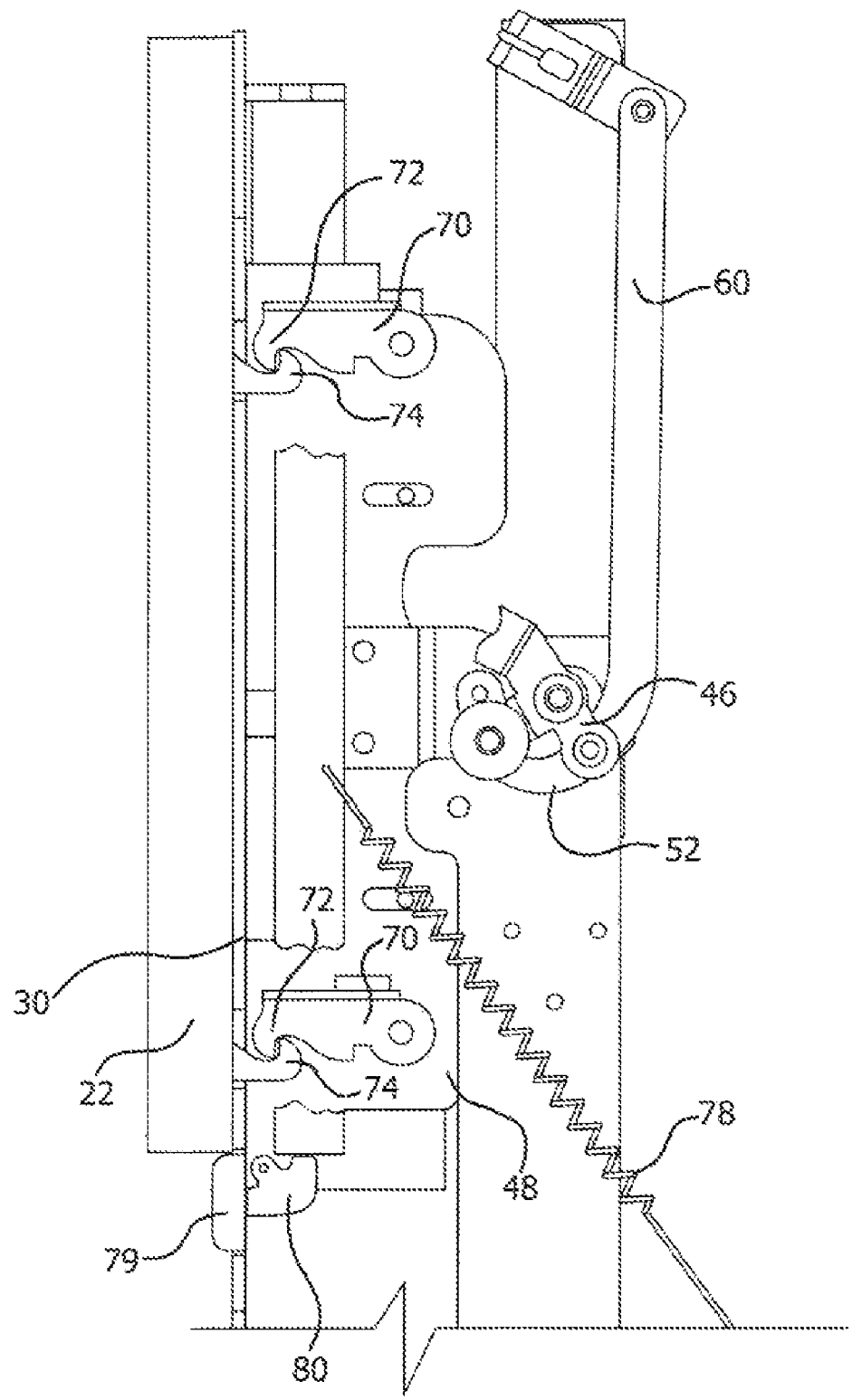

Referring to FIGS. 10A and 10B, a side view of the right lock subassembly 26 is shown which illustrates a door latching system. Attached to the plate 48 are at least one and more preferably two spaced apart door latches 70. The latches 70 are each pivotally attached at one end to the plate 48 so that they can pivot or rotate on the plate 48. On the opposite end of the latches are latch hooks 72. The latch hooks 72 engage with door hooks 74 on the door to lock the door 22 to the housing 12 when the door is in its closed position. In operation, as the door closes, the door hooks 74 pass through openings in the mounting plate 30 and engage with the latch hooks 72.

If there are two door latches 70, they are preferably attached to one another by a vertical bar 76. As shown, the door latches 70 are connected to the bar 76 such that as the vertical bar 76 moves upward, it causes both door latches 70 to simultaneously rotate clockwise as shown in the drawings, thus disengaging the latch hooks 72 from the mating door hooks 74. A spring 78 is preferably attached to one of the latches 70 or the vertical bar 76 so as to bias the latches downward and, therefore, into engagement with the door hooks 74 when the door is closed.

The door preferably includes a release button 79 that is mounted to the housing and accessible through the front of the housing. A disengagement member 80 is pivotally mounted to the housing 12 and positioned below the bottom of the vertical bar 76. When the door is closed, and the door hooks 74 are engaged by the latch hooks 72, if the release button 79 is pushed inward, it pivots which causes an end to push upward on the bottom vertical bar 76. The upward motion of the bar 76 causes the latches 70 to pivot upward thereby disengaging the latch hooks 72 from the door hooks 74 and, thus, unlocking the door.

While the door latching system has been described as having mating hooks, it should be readily apparent that the system can include one hook that engages with a mating pin. Thus, many variations are possible and would be apparent to those skilled in the art in light of the above teaching.

As discussed above, the door latches 70 are mounted to the actuator plate 48. When the door 22 is initially shut, with the door hooks engaging with the latch hooks, the door is locked from opening. At this point, the actuator plate 48 has not been transitioned laterally. As such the door is sealed only by the seals between the door and the front wall, and the engagement between the door and latch hooks. The lever 38 is then pivoted downward from its unsealed position (FIG. 6) to its sealed position (FIG. 7). This results in a transitioning of the actuator plate 48 away from the door. Since the latches 70 are mounted on the actuator plate 48, the later sliding of the actuator plate relative to the sidewall of the housing results in a pulling of the latch hook 72 toward the rear of the oven. Since the latch hook 72 and door hook 74 are engaged, the transition of the actuator plate 48 pulls the door hook 74, and thus the mounting plate 30 and door 22 tight against the front of the enclosure. This provides an increased seal between the door 22 and the housing 12. The arrangement above acts as a floating or movable mount for the door latching system.

At the point when the linkage 52 has pulled the door 22 into the housing 12, shown in FIG. 7, the oven is sealed with the door in its sealed position so as to maintain pressure within the cavity 20. The present invention provides an additional feature that is part of the locking assembly. That is, the lever 38 and linkage 52 include a pressure lock mechanism. More particularly, the shape of the linkage 52 is designed such that, after the lateral pull of the door toward the housing 12, further rotation of the lever 38 (from FIG. 7 to FIG. 8) causes the linkage 52 to rotate about the pin 40 so that the inner curved portion 53 rotates into engagement with the pin 40 (the pressure lock position). This results in the inner curved portion 53 being positioned on the opposition side of the pin 40 from the door 22. As a consequence, when pressure builds up within the oven, the forces generated on the door 22 act to pull the linkage 52 into the pin 40. However, since the pin is mounted to the housing 12 through the plate 32, the housing 12 reacts the load. Thus, the lever and linkage 52, in combination with the pin 40, plate 32 and housing, provide a pressure lock mechanism for preventing internal pressure from forcing the door open.

An electrical or mechanical interrupt can be incorporated into the oven 10 to make sure the lever 38 is in the fully sealed and locked (downward) position (shown in FIG. 8) so that the door is locked before the oven can be activated. For example, a sensor can be located at the lower end of the slot 44 to detect when lever arm 42 is at the bottom of the slot which means the door is locked. Alternatively, a lateral seat can be formed in the slot in which the lever sits when fully locked.

In one embodiment, a connector assembly attaches the right locking subassembly to the left locking subassembly for transmitting the motion of the lever 38 into an actuation or translation of components on the left locking subassembly 28. Referring to FIGS. 4-7, which depict one contemplated embodiment of the invention, a connector arm 60 is attached to the lever plate 46 and extends upward. As will be discussed below, the connector arm 60 is designed to transmit the locking and unlocking motion of the right locking subassembly 26 to the left locking subassembly 28 so that the motion of the lever 38 produces a resultant motion on the opposite, left side of the housing 12. The connector arm 60 is mounted to the lever plate, preferably to the same mounting lug on the lever plate 46 that the attachment lug 54 of the linkage 52 attaches to such that downward motion of the lever 38 causes upward motion of the connector arm 60. Of course, the connector arm 60 can be mounted to other parts of the lever plate or be connected to the linkage 52.

Referring now to FIG. 5, the left locking subassembly 28 is shown. This subassembly 28 is similar to the right subassembly 26 and includes a connector arm 60' that is engaged with the connector arm 60 of the right locking subassembly 26 through a cross bar 62 and brackets 64, 64'. As should be apparent, upward transition of the connector arm 60 rotates the bracket 64 which is attached to cross bar 62, thus causing the cross bar 62 to rotate. This rotation, in turn, causes bracket 64' to rotate. Since the upper end of the left connector arm 60' is attached to the bracket 64' it is lifted upward when the right connector arm 60 moves upward.

The upward motion of connector arm 60' causes a linkage 52' to rotate. As with the right subassembly 26, the linkage 52' is mounted to pin 40' which is attached to the panel 32'. The panel 32' is attached to the mounting plate 30' which is attached to the housing 12. In the illustrated embodiment, the mounting plate 30' is mounted to a rear surface of the front wall. As such, the pin 40' is fixed in position and the linkage 52' is connected to and rotatable about the pin 40'. Rotation of the linkage 52' produces corresponding lateral translation of a left actuator plate 48' along the side wall of the housing in the sealing direction substantially perpendicular to the front wall, i.e., away from the front of the housing 12 toward pin 40' and the rear of the oven. The left actuator plate 48' includes a slot or opening through which the pin 40' passes so as to allow for the lateral motion of the actuator plate relative to the panel 32'. The plate 48' includes at least one and more preferably two hinge hooks 66 that are designed to engage one or more hinge pins (not shown) on the door 22 discussed in more detail below.

Operation of the connector assembly and left locking subassembly will now be explained. As the lever 38 is transitioned downward, it caused an upward movement of the connector arm 60 as described above, causing the bracket 64 to pivot about its corresponding pinned connections 65 to the crossbar 62. This, in turn, causes the cross bar 62 to rotate, which then rotates the left bracket 64'. The rotation of left bracket 64' causes the left connector arm 60' to transition upward. The upward movement of the left connector arm 60' produces rotation of the C-shaped linkage 52' that is attached at one end 68 to the connector arm 60'. An opposite end of the linkage 52' is attached to the left actuator plate 48'. As with the right linkage 52', the pinned mounting and configuration of the left linkage 52' causes the left actuator plate 48' to transition laterally along the side of the oven toward the pin 40' and the rear of the oven.

As shown in FIGS. 1, 1A, 4 and 5, attached to the left actuator plate 48' are the hinge hooks 66. The hinge hooks 66 are engaged with hinge pins 150 located on the door 12. More specifically, the door includes slots or openings 152 on the rear surface of the door. The hooks 66 are arranged to pass through the openings 152 to the interior of the door 22 where they are attached to hinge lugs 154 through the hinge pins 150. This forms a hinge assembly that permits the door to rotate or pivot about the hinge pins 150. However, as with the door latch assembly discussed above, the hinge assembly in the present invention floats. That is, it is designed to move relative to the housing as it is pulled in toward the housing to seal the opening. More specifically, as the left actuator plate 48' transitions inward, it pulls the hinge assembly 66, 150, 154, which connects the door 22 to the housing 12, inward. This has the affect of drawing the door 22 in tight on the hinge side of the door 22. Thus, contrary to normal door designs which lock the side of the door opposite from the hinge, the present invention is designed to draw both sides of the door 22 inward against the frame of the oven, thus providing a tight seal and extra protection against seal leakage. This design permits the oven to accommodate increased pressure.

As discussed above, in one embodiment, the rotation of the linkages 52, 52' produces lateral motion of less than one half inch, and more preferably about ¼ inch. This lateral motion occurs during the initial rotation of the linkages 52, 52'. After the lateral motion of the actuator plates 48, 48' has completed, the remaining rotation of the linkages 52, 52' produces the pressure locking of the subassemblies as discussed above so as to counteract the forces exerted on the door due to pressure that develops in the oven during use.

Figure 9A:
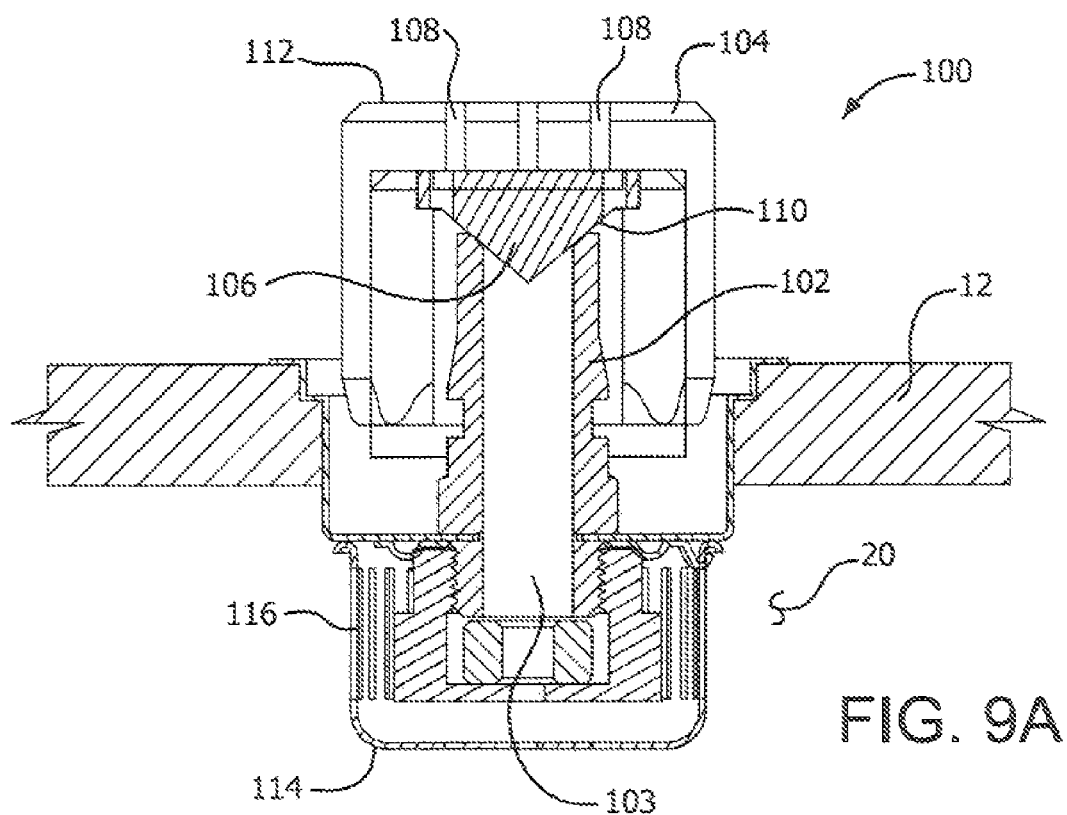
FIGS. 9A and 9B illustrate cross-sectional views of an embodiment of a pressure limit valve for use in the oven of FIG. 1.
Figure 9B:
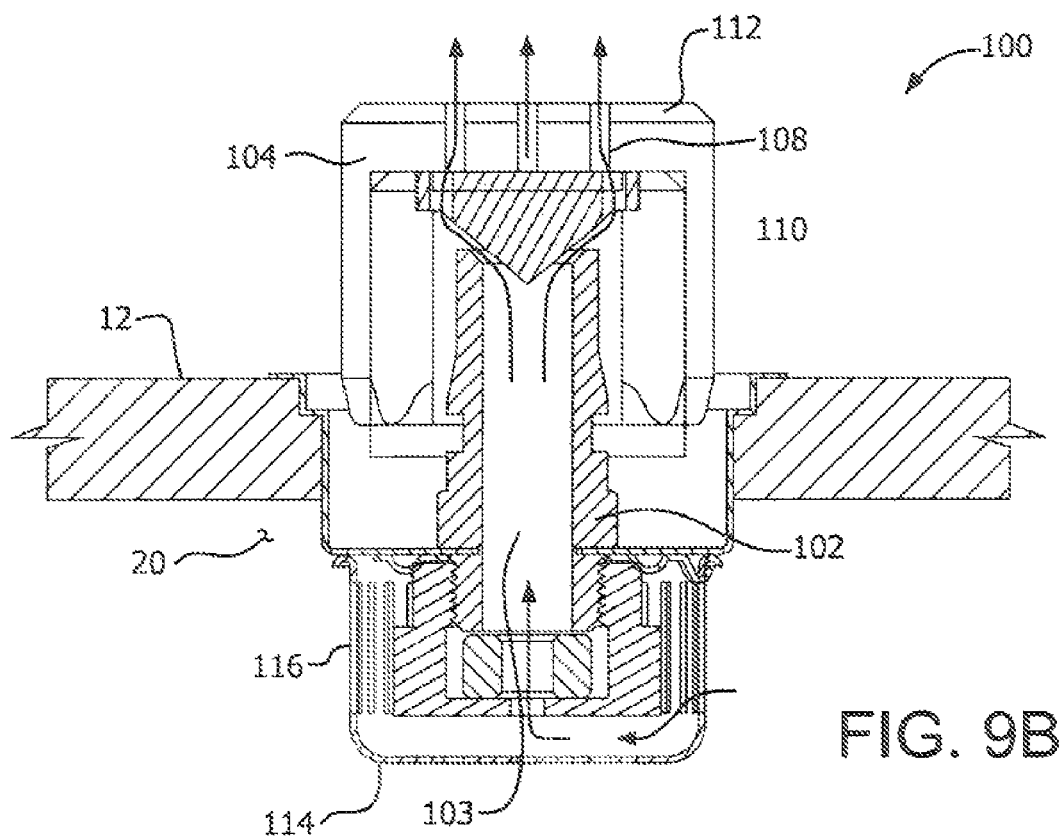

The oven also preferably includes a pressure limit and release system. During normal operation of the oven pressure builds within oven. Because the door is sealed, as operating time increases, the pressure inside the oven continues to increase. If left unrestricted, the pressure can become significant, prematurely wearing the parts. As such a pressure limit mechanism is included in the oven. Also, in order to reduce pressure on the door prior to opening, a pressure release mechanism is included as part of the system. To limit the pressure, the present invention includes a pressure limit and release system. Referring to FIGS. 1, 9A and 9B, in one embodiment, the oven includes a pressure limit valve 100 which is configured to release pressure above a preset value, i.e., a first pressure threshold level. In one configuration, the valve 100 is a weighted release valve. Specifically, the limit valve 100 includes a base tube 102 mounted to the housing 12 which has an interior conduit 103 that communicates with the interior of the cavity for channeling the pressurized gas from the interior to the outside. A cover 114 is preferably removably attached to the valve 100 and extends into the cavity. The cover 114 includes a plurality of vents 116 for permitting pressurized air from within the cavity to pass into the conduit 103 as depicted by the arrows in FIG. 9B. The cover can be easily removed from inside the oven to permit cleaning.

A weighted cap 104 is mounted to the base tube 102 and designed to move upward as will be explained below. The weighted cap includes a plug portion 106 sized to cover or otherwise block the exit of the base tube 102. The cap 104 locks onto the base tube 102 and is preferably removable for cleaning. The method of attachment can vary, but includes threaded, snap, or bayonet mounting arrangements. The cap 104 includes one or more vents or ports 108 that preferably have a diameter smaller than the diameter of the base tube 102. The vent holes 108 each extend from a bottom surface 110 of the cap 104 to a top surface 112 which communicates with the atmosphere. The vent hole opening on the bottom surface 110 is located so as to be blocked by a surface of the base tube 102 when the cap 104 sits on top of the base tube 102 in the normal pressure position. The vent hole opening on the bottom surface 110 is located spaced apart from the surface of the base tube 102 when the cap 104 is raised above the top of the base tube 102 in an over pressure position.

As the pressure within the oven increases, the pressurized gases from within the oven pass from the cavity though the base tube 102. During normal operation when the gases within the oven are below a threshold value, the cap 104 sits on top of the base tube 102 in its normal pressure position. In this position, the plug 106 blocks the outlet of the base tube thus preventing pressurized gases from exiting the tube and cap. The weight of the cap is set such that, when the gases within the tube exceed a certain threshold pressure value, the pressurized gases cause the cap to rise upward away from the top opening of the tube. At this point, the plug 106 is no longer blocking the outlet of the base tube 102. As such, pressurized gas can flow out. However, to control the amount of pressure exiting and, thereby, maintain an adequate pressure within the oven, the exiting gas is restricted by the cap to pass only through the vent holes 108. In one preferred embodiment, the cap weight and vent holes are set so as to permit gas within the oven to build up to a maximum of about 1 psi. It should be readily apparent that by changing the weight of the cap 104, the opening pressure for the pressure limit valve 100 can be changed. So while 1 psi is a preferred maximum pressure in one embodiment, other pressures can be set as the maximum.

While the pressure limit valve 100 is described as having a weighted cap, other conventional pressure release valves can be used, such as a check valve that uses a weighted ball bearing inside a tube through which the pressurized gas passes, the ball bearing closes the tube until the forces on the ball bearing are sufficient to raise the ball. Those skilled in the art would understand that various other valves can be used in the present invention.

A second or pressure relief or vent valve 117 is preferably located on the oven. In the illustrated embodiment shown in FIGS. 2 and 3, the pressure release mechanism is shown and includes a relief valve 117 mounted on the side of the oven adjacent to the left or right lock assemblies 26, 28. It should be readily apparent that other locations on the oven are possible. The relief valve 117 communicates with the interior of the cavity and includes an exhaust conduit 118 that is connected to an accumulator 119. The accumulator 119 is configured to capture moisture that is exhausted out of the conduit 118 while venting pressurized gas. The accumulator 119 may include a tray 120 into which the moisture collects. Accumulators are well known and, therefore, no further discussion is needed. The tray 120 is preferably accessible from outside the oven enclosure 11 for draining and/or cleaning. The valve 117 preferably includes a switch 122 that toggles the valve between an open, venting position which permits gas to be vented from interior cavity 20 out along the exhaust conduit 118, and a closed position which prevents gas from exiting the cavity. The switch 122 is controlled, in one embodiment, by the position of the lever 38. Specifically, when the lever is in a venting position, which is a position located between the pressure lock position (FIG. 8) and the unlocked position (FIG. 6), the valve 117 is in its open position thus permitting venting of the oven. The point where the switch 122 is opened is more preferably between the lever sealed position (FIG. 7) and the lever pressure lock position (FIG. 8). When the lever 38 is in the pressure lock position (FIG. 8), which is the operating state of the oven, the valve 117 is in its closed position.

During operation of the oven, pressure will build up within the oven cavity. When it is desirable to open the door 22, the pressure within the oven should be released to a certain degree prior to permitting the door to be opened. As such, in one embodiment, as the user moves the lever away from the pressure lock position (FIG. 8) to an intermediate position (the venting position) the lever causes the valve 117 to open, thus permitting pressurized air in the oven to bleed or vent to the accumulator 119 where moisture in the air is captured and the air is allowed to vent to atmosphere. In one embodiment, the lever 18 controls the opening and closing of the valve 117 by a roller 124 mounted on the lever plate 46. The roller 124 is located so that when the lever is in the pressure lock position (FIG. 8), the roller 124 is engaged with the spring biased switch 122 on the valve 117 keeping the switch pressed down against the biasing force of the spring. During opening, as the lever 38 is rotated to the venting position (i.e., away from the position in FIG. 8), the roller 124 rolls off the switch 122. The biasing force of the spring urges the switch 122 upward, thereby opening the valve 117 and allowing pressurized air to vent out. While a mechanical opening device is shown for the valve 117, it is also contemplated that other mechanical, electromechanical and/or electrical systems can be used. For example, the lever need not be mechanically connected to the switch 122. Instead, as the lever moves to a venting position, an electrical sensor can detect the lever and activate an electrical switch that opens the valve 117.

As shown in FIG. 12, the oven 10 may include a backup over pressure valve 130 mounted to the housing and communicating with the interior of the cavity. The overpressure valve 130 is set to release pressure at a second pressure threshold level that is higher than the first pressure threshold level of the pressure limit valve 100. For example, in one embodiment the overpressure valve 130 is set to release pressure or open when the pressure within the cavity reaches or exceeds, for example, approximately 1.5 psi or 2 psi. Thus, the valve 130 opens when the pressure that it is exposed to is above the second pressure threshold level. Preferably the overpressure valve 130 is a spring biased popup valve with vent holes. When the second pressure threshold level is exceeded, the forces due to the pressure overcome the biasing force that maintains the valve 130 in its closed position, causing it to open the valve 130 and vent pressure through the vent holes. Pop-up or spring biased pressure valves are known and, therefore, no further discussion is necessary.

The present invention may also includes a safety door pressure system to protect against failure of the door window seals. More specifically and with reference to FIGS. 1, 12, 13A and 13B the door 22 is illustrated in one embodiment as having double panes of glass. Specifically, the door 22 includes an inner window 200 that is sealed to a door frame 210 so as to prevent the passage of air from inside the oven cavity 20 to the outside. A second outer window 204 is mounted on the outer facing surface of the frame 210. The outer window is not sealed to the frame. Instead, there are a series of vented openings 206 around the periphery of the glass 204. The vented openings 206 permit passage of air from one side to the other side of the window 204. In one embodiment there are 16 vented openings spaced about the periphery of the outer window.

Figure 2:
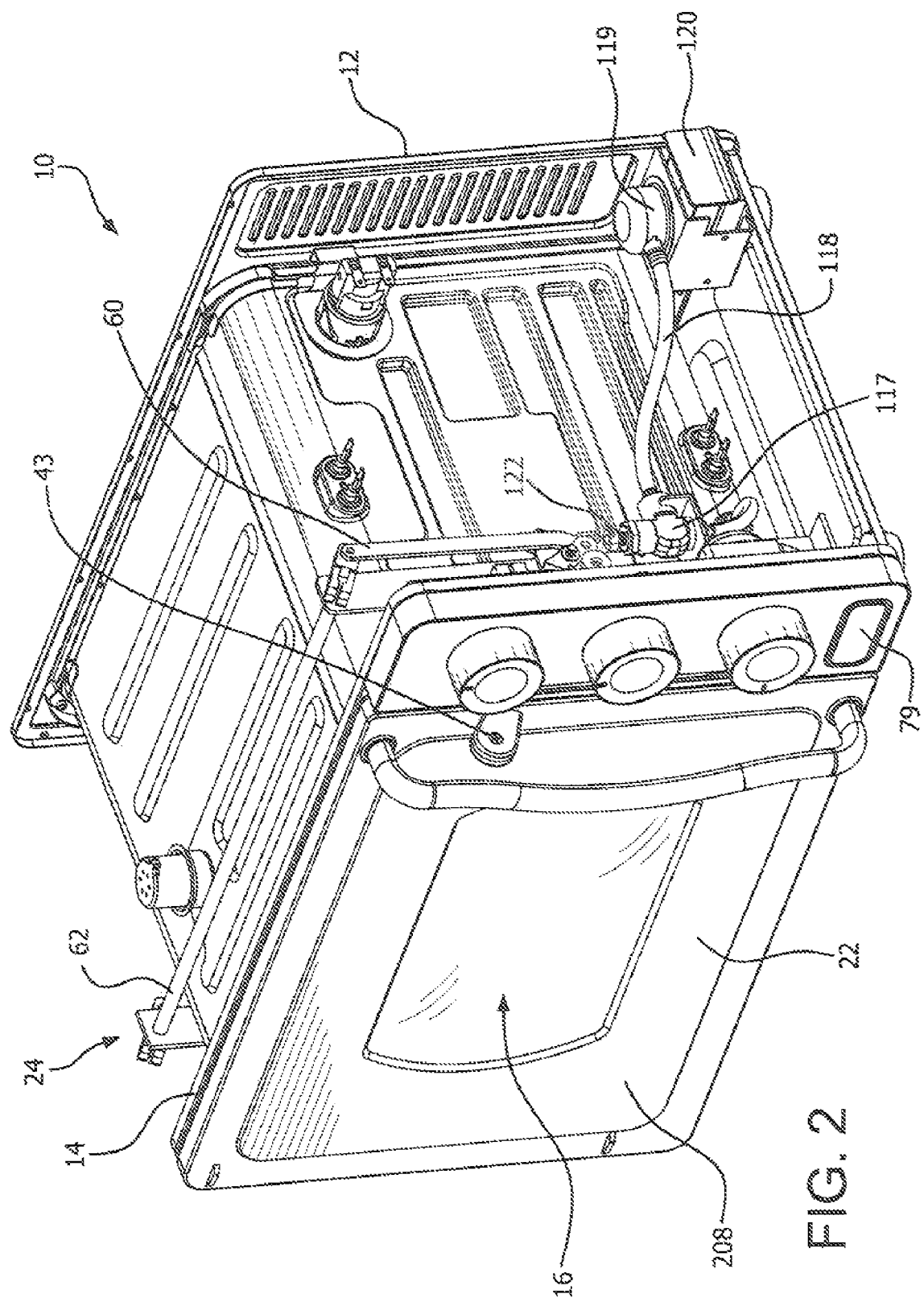
FIG. 2 is an isometric view of the oven of FIG. 1 with the outer enclosure of the oven removed.

In the event of breakage of the inner window 200, pressurized air will pass toward the outer window 204. The prevent the outer window from bursting out or shattering, the vented openings 206 permit the air to pass outward around the outer window 204 and openings formed in the front door facing 208 (FIG. 2).

The oven 10 includes a heating system, such as an electric or gas heater. In one embodiment, the heating system is an electric heating system that includes one or more electric burners or heating coils or rods mounted within the housing 12 for radiating heat into the cavity 20. Preferably the electric coils 15 are positioned along the bottom with a suitable deflector or mesh screen (not shown). In an electric heating system, the oven would preferably include an electric supply (not shown) for connecting to an electric power source. A control system would control the flow of the electric power to the coil. To efficiently control the heat generation in the oven, the walls of the housing 12 may be insulated, such as with a ceramic sheets, thermal insulation or fiber board.

In an alternative embodiment, the heating system can be a gas heating system that includes gas burners positioned along the bottom and/or top of the enclosure and a deflector for providing more efficient heat distribution, similar to conventional oven arrangements. A gas heating conduit would be used to supply natural gas from a natural gas source. An ignition system, such as a pilot light or electric igniter, would be incorporated for igniting the natural gas, as is common in the art.

In addition to, or as an alternate for, the gas or electric heating systems, the present invention may include a radiant heating system. Radiant heaters are generally known, and can be incorporated into the heating system so as to provide a mechanism for crisping the external surface of the food product being cooked.

In one embodiment, the oven 10 includes more than one form of heating element 15. For example, the housing may include a radiant heater preferably mounted on or near the top of the cavity, and a conductive or resistive heater or rods mounted on the sides and/or bottom of the housing. The positioning of the radiant heater on the top and the conductive rods on the side has several benefits. First, the positioning above or to the side of the food prevents wet drippings from the foods being cooked from dropping onto the heating elements, which would cause the drippings to boil and create smoke. Second, locating the radiant heater on the top facilitates browning of the surface of the food being cooked.

It is also contemplated that one or more of the heating elements 15 can be induction heaters. The induction heaters can be located on anywhere from one to six sides of the oven and, as with the other heating elements discussed above, independently controlled for heating different sides of the food being cooked for different times. Local thermostats can detect localized temperature and adjust heating as deemed necessary. The induction heaters can be used in additional to the other heating elements and may be controlled to provide only preheating or involved in the full cooking process.

A pressure source may be incorporated into the oven to supply a pressurized gas, such as air, into the cavity 20. The pressure source may be mounted to the housing, although it is also anticipated that the pressure source can be external from the oven 10 and connected through suitable conduits. In one exemplary embodiment, the pressure source is a high pressure air or gas compressor capable of supplying pressurized air between 0 and 20 psi. One or more gas supply conduits connect the pressure source to the oven housing 12.

A pressure sensor may be mounted within the housing 12 for sensing pressure in the cavity 20. The pressure sensor may be attached to a pressure gauge mounted on the oven. The pressure sensor monitors the pressure within the cavity 20 and provides a reading on the pressure gauge. The pressure gauge may be analog or digital.

The oven may include an atmosphere enhancement system in one embodiment for altering the composition of the gas within the interior in order to produce a gaseous atmosphere within the interior of the enclosure during a cooking process that enhances the cooking of the food product. For example, in one embodiment, the atmosphere enhancement system includes a supply conduit for channeling a substance into the interior to cause the gas within the interior to become acidic or to increase the nitrogen in the air within the cavity in order to facilitate cooking. Other flavor enhancements can be used.

The heating system may include an oven temperature monitor to detect the temperature of the inside of the cavity 20. The oven temperature monitor preferably includes an oven temperature sensor positioned within the housing 12, and a display or gauge preferably located outside the housing. The oven temperature monitor may be a conventional analog thermometer designed to operate within the anticipated temperature ranges and pressures. More preferably, the oven temperature monitor is digital with a digital signal from the temperature sensor being displayed as a temperature value on the display. Oven temperature sensors, displays and monitors are well know in the art and, therefore, no further discussion is necessary.

The heating system may also include a food temperature monitor to detect and monitor the temperature of the food. The food temperature monitor preferably includes a food temperature sensor positioned within the housing 12 and which may be a conventional temperature probe designed to be inserted into the food product. A display or gauge is preferably located outside the housing. The food temperature monitor may be a conventional analog thermometer designed to operate within the anticipated temperature ranges and pressures. More preferably, the food temperature monitor is preferably a digital device that receives a digital signal from the food temperature sensor and displays it as a temperature value on the display. Food temperature sensors, displays and monitors are well know in the art and, therefore, no further discussion is necessary.

An electronic controller may be incorporated into the oven for controlling the cooking process. The controller is adapted to receive, for example, a variety of information, preferably including signals indicative of the pressure inside the enclosure from the pressure sensor, the temperature inside the enclosure from the oven temperature sensor, and the temperature of the product being cooked from the food temperature sensor. The electronic controller is preferably configured to control one or more features and/or components of the oven. For example, if a pressure source is incorporated into the oven, the controller can control the supply of pressurized gas. The controller may also be connected to the heating elements and control the operation of the various heating elements in response to external inputs (such as a user depressing certain keys on a panel or turning certain selection knobs) or a programmed input from a stored program. In such an embodiment, if the controller senses that the pressure within the enclosure is below a desired value, the controller controls a valve for supplying the pressurized gas along the supply conduit until the pressure within the enclosure is above a desired level. Alternately, the controller could activate the pressure source to begin to further pressurize the gas that is supplied.

The controller could also activate an alarm if a prescribed time frame has completed (e.g., cooking cycle) or if a pressure exceeds a desired value. The controller could also control the heating elements to reduce the temperature within the cavity in accordance with a prescribed program or from a cooking temperature to a warming temperature after the cooking time has expired. In another example, the controller can be programmed to turn the radiant heater on at the beginning or in the middle of a cooking cycle, prior to completion of the cooking cycle, in order to brown the outside of the food being cooked in order to seal in the juices before the cooking of the food is completed.

The controller may also include a memory for storing various predetermined cooking procedures, and a selection device, such as a touch screen, buttons, keyboard or other mechanism for allowing an operator to program, store, and/or select a cooking procedure. Other uses and configurations for the controller will be apparent from the discussions herein. A variety of controllers exist that can be configured to provide the necessary functionality described herein, including controllers using hardware, software or firmware components. The selection device may be physically attached to the controller or may be a separate component such as a remote control unit. It is also contemplated that the controller could be connected to a wireless or wired network (either directly or through the internet) so that remote programming and monitoring of the controller, and hence the oven, is possible using a standard general purpose computer or a dedicated computer device with an internal memory suitable programmed to store and provide electrical signals to the oven for controlling it in accordance with the teachings described herein. As such, as series of ovens in a cooking facility can be monitored and controlled through a single computer system.

Although the controller has been described as being separate from the gauges and controls for the heating system, it is also contemplated that features of the heating controls, such as the gauges, can be part of the controller, or that the heating controls, including the displays, and monitoring and control functionality can be provided through a software based system that operates through a display screen mounted to or separate from the oven.

Although the present invention has been described with a lever that provides the actuation of the locking assembly; it is also contemplated that the lever may be replaced with a motor that controls the translation of the actuator plates. For example, a stepper motor could be mounted to the housing and engaged with one or both of the actuator plates. A control switch can be mounted on the housing that controls operation of the stepper motor. When a user activates the switch, it turns on the stepper motor for a sufficient time to transition the actuator plates and, thus, draw the door into the face of the front wall thereby sealing the oven. Alternatively, the oven can seal automatically (i.e., the door being drawn into the front wall) anytime the door is closed and the oven is on. A sensor can be used to detect when the door is closed and the power on the oven is active, at which point a motor is activated to seal the door. Similarly when it is desirable to open the oven, the oven can automatically first release the pressure within the oven cavity through the release valve and then unseal the door.

While the present application has depicted the actuator plates as flat panels, it should be readily apparent that they need not be flat, but can be bars, rods or brackets that provide the necessary structure for supporting the components.

The invention claimed is:

1. An oven for heating food products under pressure, the oven comprising:
  a housing having side walls, a rear wall and a front wall, the walls defining an enclosure with a cavity inside in which the food products are placed for heating, the front wall of the housing including an opening which permits access to the cavity;
  a door hingedly mounted to the housing through a hinge assembly and including a latch for closing off the opening in the oven, the door having a first hinge component, and a first door latch component;
  a locking assembly attached to the housing and configured to engage with and lock the door to the housing, the locking assembly including:
    a first lock subassembly located adjacent to one of the side walls, the first lock subassembly including a first actuator plate slideably disposed adjacent to the side wall and connected so as to transition laterally along the sidewall in a sealing direction substantially perpendicular to the front wall, the first actuator plate having a second door latch component mounted on the actuator plate and adapted to engage with the first door latch component on the door for latching the door to the first actuator plate when the door is closed against the front wall of the oven, a locking device mounted to the housing and engaged with the first actuator plate, the locking device adapted to transition the first actuator plate in the sealing direction from an unsealed position to a sealed position, the first actuator plate being further from the front wall of the housing in the sealed position than in the unsealed position, the first actuator plate when transitioned by the locking device between the unsealed position and the sealed position is adapted to transition the first and second door latch components in the sealing direction when they are engaged, wherein the transition of the first and second door latch components in the sealing direction functions to pull the door into the front wall of the oven;
    a second lock subassembly located adjacent to another side wall, the second lock subassembly including a second actuator plate slideably disposed adjacent to the side wall and connected so as to transition laterally along the side wall in the sealing direction, a connector assembly attached to the second actuator plate and the first actuator plate such that transition of the first actuator plate in the sealing direction causes the second actuator plate to transition laterally along the side wall in the sealing direction, a second hinge component mounted on the second actuator plate and engaged with the first hinge component for hingedly attaching the door to the second actuator plate, the second actuator plate adapted to transition the first and second hinge components in the sealing direction when the first actuator plate transitions the first and second door latch components in the sealing direction, the transition in the sealing direction of the first and second hinge components functioning to pull the hinged door into the front wall of the oven.

2. The oven of claim 1, wherein the a locking device is an actuation lever pivotally mounted to the housing, the lever including a lever arm that extends forwardly past the front wall of the housing and adjacent to the door, the lever having a lever mounting plate connected to the arm and pivotally mounted to the housing; and
  wherein the first actuator plate is connected to the lever mounting plate such that rotation of the lever causes the first actuator plate to transition laterally along the side wall in the sealing direction, and wherein the rotation of the lever causes the second actuator plate to transition laterally along the side wall in the sealing direction.

3. The oven of claim 1, wherein the door has a front surface, a back surface, and wherein the first hinge component and the first door latch component are accessible from the back surface of the door.

4. The oven of claim 1 wherein the connector assembly includes a first connector arm connected to the first actuator plate, a second connector arm connected to the second actuator plate, and a crossbar attached to the first and second connector arms.

5. The oven of claim 1 wherein the first lock subassembly includes a first linkage connecting the first actuator plate to the locking device, the first linkage adapted to cause actuation of the locking device to produce lateral motion of the first actuator plate, wherein the second latch component is pivotally mounted on the first actuator plate, and wherein the second latch component is biased against pivoting; and
  wherein the second lock subassembly includes a second linkage connecting the second actuator plate to the connector assembly and adapted to cause the actuation of the locking device to produce lateral motion of the second actuator plate.

6. The oven of claim 5 wherein the connector assembly includes a first connector arm attached to the linkage, a second connector arm attached to the second actuator plate, and a crossbar extending from one side of the oven to the other, the crossbar attached to the first connector arm though a bracket such that upward movement of the first connector are causes rotation of the crossbar; and wherein the crossbar is attached to the second connector arm through a bracket such that rotation of the crossbar causes the second connector arm to move upward.

7. The oven of claim 2 wherein the first lock subassembly includes a first linkage connecting the first actuator plate to the lever plate, the first linkage adapted to cause the rotary motion of the lever to produce lateral motion of the first actuator plate, wherein the second latch component is pivotally mounted on the first actuator plate, and wherein the second latch component is biased against pivoting; and
  wherein the second lock subassembly includes a second linkage connecting the second actuator plate to the connector assembly and adapted to cause the rotary motion of the lever to produce lateral motion of the second actuator plate.

8. The oven of claim 7 wherein the connector assembly includes a first connector arm attached to the lever plate, a second connector arm attached to the second actuator plate, and a crossbar extending from one side of the oven to the other, the crossbar attached to the first connector arm though a bracket such that upward movement of the first connector arm causes rotation of the crossbar; and wherein the crossbar is attached to the second connector arm through a bracket such that rotation Of the crossbar causes the second connector are to move upward.

9. The oven of claim 7 wherein the first linkage is attached to the lever plate and the actuation plate on opposite sides of the location where the lever plate is pivotally attached to the housing, and wherein the lever has a locking position in which the location of the linkage attachment to the lever plate is on the opposite side of where the lever plate is pivotally attached to the housing from the front wall.

10. The oven of claim 1, wherein a release bar is attached to the second latch component at a point spaced apart from where the second latch component attaches to the actuator plate, the release bar adapted to pivot the second latch component out of engagement with the first latch component when the release bar is translated relative to the actuation plate, and where the oven includes a button mounted on the oven and connected to the release bar, the button adapted to cause the release bar to translate when the button is depressed.

11. The oven of claim 1, further comprising a pressure release system including a release valve mounted to the housing, the release valve having an open and closed position, and a conduit connected to the housing and communicating with the cavity, the release valve controlling flow of pressurized air out of the conduit.

12. The oven of claim 11, wherein the release system includes an accumulator connected to the release valve, the release valve channeling the flow of air from within the cavity to the accumulator, the accumulator adapted to capture moisture in the air prior release to the atmosphere.

13. The oven of claim 11, wherein the release valve includes an actuation switch, the actuation switch having a first state wherein the valve is in its open position and a second state wherein the valve is in its closed position, and wherein the actuation of the switch between its first and second states is controlled by the position of the first actuator plate.

14. The oven of claim 13, wherein the actuation switch is a depression switch and wherein the first state corresponds to the depression switch not being depressed, and wherein the first actuator plate includes a surface that is adapted to engage with and depress the depression switch for causing the switch to be in its second state.

15. The oven of claim 11, wherein the release system includes a first limit valve mounted to the housing and including a conduit communicating with the cavity, the limit valve configured to permit pressurized air to flow out of the conduit when the pressure within the conduit exceeds a prescribed threshold value.

16. The oven of claim 15, wherein the first limit valve includes a weighted cap with a surface that blocks the conduit when the pressure within the conduit is below the prescribed threshold value, and wherein the cap is adapted to transition relative to the conduit when the pressure in the conduit is above the prescribed threshold value, the pressure in the conduit causing the cap to transition.

17. An oven for heating food products under pressure, the oven comprising:
a housing having side walls, a rear wall and a front wall, the walls defining an enclosure with a cavity inside in which the food products are placed for heating, the front wall of the housing including an opening which permits access to the cavity;
a door hingedly attached to the housing through a hinge assembly for closing off the opening in the oven, the door including a first hinge component, and a first door latch component;
a locking assembly attached to the housing and configured to engage with and lock the door to the housing, the locking assembly including:
an actuation lever pivotally mounted to the housing, the lever includes a lever arm that extends forwardly past the front wall of the housing adjacent to the door, and a lever mounting plate connected to the arm and pivotally mounted to the housing;
a first lock subassembly located adjacent to one of the side walls, the first lock subassembly including a first actuator plate slideably disposed adjacent to the side wall and connected to the lever mounting plate such that rotation of the lever causes the first actuator plate to transition laterally along the sidewall in a sealing direction toward either the front or rear walls, the first actuator plate having a second door latch component mounted on the actuator plate and adapted to engage with the first door latch component on the door for latching the door to the first actuator plate when the door is closed against the front wall of the oven, the first actuator plate adapted to transition the first and second door latch components when they are engaged in the sealing direction when the lever is pivoted between a first open position and a second sealed position, the transition in the sealing direction functioning to pull the locked door into the front wall of the oven; and
a second lock subassembly located adjacent to one of the side walls on the opposite side of the oven from the first lock subassembly, the second lock subassembly including a second actuator plate slideably disposed adjacent to the side wall and connected so as to transition laterally along the side wall in the sealing direction, a connector assembly attached to the second actuator plate and the first actuator plate such that pivoting of the lever causes the second actuator plate to transition laterally along the sidewall in the sealing direction, the second actuator plate having a second hinge component mounted on the actuator plate and engaged with the first hinge component for hingedly attaching the door to the second actuator plate, the second actuator plate adapted to transition the first and second hinge components in the sealing direction when the lever is pivoted between its first open position and its second sealed position, the transition in the sealing direction functioning to pull the hinged door into the front wall of the oven.

18. The oven of claim 17 wherein the connector assembly includes a first connector arm attached to the lever plate, a second connector arm attached to the second actuator plate, and a crossbar attached to the first and second connector arms.

19. The oven of claim 17 wherein the first lock subassembly includes a first linkage connecting the first actuator plate to the lever plate, the first linkage adapted to cause the rotary motion of the lever to produce lateral motion of the first actuator plate, wherein the second latch component is pivotally mounted on the first actuator plate, and wherein the second latch component is biased against pivoting; and
wherein the second lock subassembly includes a second linkage connecting the second actuator plate to the connector assembly and adapted to cause the rotary motion of the lever to produce lateral motion of the second actuator plate.

20. The oven of claim 19 wherein the connector assembly includes a first connector arm attached to the lever plate, a second connector arm attached to the second actuator plate, and a crossbar extending from one side of the oven to the other, the crossbar attached to the first connector arm though a bracket such that upward movement of the first connector arm causes rotation of the crossbar; and wherein the crossbar is attached to the second connector arm through a bracket such that rotation of the crossbar causes the second connector arm to move upward.

21. The oven of claim 19 wherein the first linkage is attached to the lever plate and the actuation plate on opposite sides of the location where the lever plate is pivotally attached to the housing, and wherein the lever has a pressure lock position in which the location of the linkage attachment to the lever plate is on the opposite side of where the lever plate is pivotally attached to the housing from the front wall.

22. The oven of claim 20, wherein a release bar is attached to the second latch component at a point spaced apart from where the second latch component attaches to the actuator plate, the release bar adapted to pivot the second latch component out of engagement with the first latch component when the release bar is translated relative to the actuation plate, and where the oven includes a button mounted on the oven and connected to the release bar, the button adapted to cause the release bar to translate when the button is depressed.

23. The oven of claim 17, further comprising a pressure release system including a release valve mounted to the housing, the release valve having an open and closed position, and a conduit connected to the housing and communicating with the cavity, the release valve controlling flow of pressurized air out of the conduit; and an accumulator connected to the release valve, the release valve channeling the flow of air from within the cavity to the accumulator, the accumulator adapted to capture moisture in the air prior release to the atmosphere.

24. The oven of claim 23, wherein the release valve includes an actuation switch, the actuation switch having a first state wherein the valve is in its open position and a second state wherein the valve is in its closed position, and wherein the switch is actuated between its first and second states by the lever.

25. The oven of claim 24, wherein the actuation switch is a depression switch and wherein the first state corresponds to the depression switch not being depressed, and wherein the lever plate includes a surface that is adapted to engage with and depress the depression switch for causing the switch to be in its second state.

26. The oven of claim 23, wherein the release system includes a first limit valve mounted to the housing and including a conduit communicating with the cavity, the limit valve configured to permit pressurized air to flow out of the conduit when the pressure within the conduit exceeds a threshold pressure value.

27. The oven of claim 26, wherein the first limit valve includes a weighted cap with a surface that blocks the conduit when the pressure within the conduit is below the prescribed threshold value, and wherein the cap is adapted to transition relative to the conduit when the pressure in the conduit is above the threshold pressure value, the pressure in the conduit causing the cap to transition.

28. An oven for heating food products under pressure, the oven comprising:
a housing having side walls, a rear wall and a front wall, the walls defining an enclosure with a cavity inside in which the food products are placed for heating, the front wall of the housing including an opening which permits access to the cavity;
a door hingedly attached to the housing through a hinge assembly for closing off the opening in the oven, the door including a first hinge component, and a first door latch component;
a locking assembly attached to the housing and configured to engage with and lock the door to the housing, the locking assembly including:
an actuation lever pivotally mounted to the housing, the lever includes a lever arm that extends forwardly past the front wall of the housing adjacent to the door, and a lever mounting plate connected to the arm and pivotally mounted to the housing;
a first lock subassembly located adjacent to one of the side walls, the first lock subassembly including a first actuator plate slideably disposed adjacent to the side wall and connected to the lever mounting plate through a first linkage, the first linkage adapted to cause the pivoting motion of the lever to produce lateral motion of the first actuator plate along the side wall in a sealing direction substantially perpendicular to the front wall, the first actuator plate having a second door latch component mounted on the actuator plate and adapted to engage with the first door latch component on the door for latching the door to the first actuator plate when the door is closed against the front wall of the oven, the first actuator plate adapted to transition the first and second door latch components when they are engaged in the sealing direction when the lever is pivoted between a first unsealed position and a second sealed position, the transition of the first actuator plate in the sealing direction functioning to pull the locked door into the front wall of the oven, and the second latch component being pivotally mounted on the first actuator plate so as to be biased against pivoting;
a second lock subassembly located adjacent to one of the side walls on the opposite side of the oven from the first lock subassembly, the second lock subassembly including a second actuator plate slideably disposed adjacent to the side wall and connected to a connector assembly through a second linkage, the second linkage adapted to cause motion of the connector assembly to produce lateral motion of the second actuator plate along the side wall in the sealing direction, the second actuator plate having a second hinge component mounted on the actuator plate and engaged with the first hinge component for hingedly attaching the door to the second actuator plate, the second actuator plate adapted to transition the first and second hinge components in the sealing direction when the lever is pivoted between its first unsealed position and its second sealed position, the transition of the second actuator plate in the sealing direction functioning to pull the hinged door into the front wall of the oven; and
the connector assembly attaching the second actuator plate to the first actuator plate or lever such that pivoting of the lever causes the second actuator plate to transition laterally along the side wall in the sealing direction, the connector assembly including a first connector arm attached to the lever plate, a second connector arm attached to the second actuator plate, and a crossbar extending from one side of the oven to the other, the crossbar being attached to the first connector arm though a bracket such that upward movement of the first connector arm causes rotation of the crossbar, and the crossbar being attached to the second connector arm through a bracket such that rotation of the crossbar causes the second connector arm to move upward, and wherein the second linkage is connected to the second connector arm such that upward or downward movement of the connector arm rotates the second linkage so as to cause lateral transition of the second actuator plate.

\* \* \* \* \*